United States Patent [19]
Hollander et al.

[11] Patent Number: 5,910,030
[45] Date of Patent: Jun. 8, 1999

[54] ANTENNA-EFFECT SUPPESSOR METHOD AND DEVICE PARTICULARLY FOR THERMOCOUPLES AND OTHER DISSIMILAR METAL CONDUCTOR COMBINATIONS

[75] Inventors: Milton Bernard Hollander; William Earl McKinley, both of Stamford; Russell Stewart, Fairfield, all of Conn.

[73] Assignee: Omega Engineering, Inc., Stamford, Conn.

[21] Appl. No.: 08/710,683

[22] Filed: Sep. 24, 1996

Related U.S. Application Data

[63] Continuation-in-part of application No. 08/605,607, Feb. 22, 1996, abandoned.

[51] Int. Cl.[6] .................................................. H01R 13/66
[52] U.S. Cl. ........................................... 439/620; 439/696
[58] Field of Search .................................... 439/695, 696, 439/620

[56] References Cited

U.S. PATENT DOCUMENTS

| | | | |
|---|---|---|---|
| 2,436,586 | 2/1948 | Mangold | 439/692 |
| 2,850,712 | 9/1958 | Franklin | 439/696 |
| 3,020,518 | 2/1962 | Camping | 439/696 |
| 4,194,805 | 3/1980 | Ayer | 439/696 |
| 5,551,893 | 9/1996 | Johnson | 439/620 |
| 5,586,902 | 12/1996 | Hopf et al. | 439/352 |

OTHER PUBLICATIONS

Research Disclosure, Sep. 1990, No. 317 Kenneth Mason Publications, Ltd, England Sep. 1990.

*Primary Examiner*—Gary Paumen
*Assistant Examiner*—Tho D. Ta
*Attorney, Agent, or Firm*—William A. Drucker

[57] ABSTRACT

The invention relates to electrical devices which include at least one pair of dissimilar metal members with respective surfaces for bringing into contact with each other or with other receptors to establish an electrical connection, and antenna-effect inhibiting means such as a ferrite composition are disposed adjacent to the connection surface of at least one of the contact members. In a form of the invention for use with single wires or a pair of multiple wires, each wire is provided with an individual antenna-effect inhibiting means, such as a ferrite housing, adjacent to a connector thereon. The invention also provides a method of making an electrical connector, having at least two electrical conduction elements of dissimilar metals, which includes steps of forming at least two dissimilar metal conductors to engage corresponding metal conductors at a junction, providing a ferrite element mounted in proximity to at least one connector near said junction and providing means to measure and display the current passing said junction. In a further method in accordance with the invention, operating an electrical circuit comprises providing at least two conductors of dissimilar metals, providing a ferrite element near at least one of those conductors of dissimilar metals at a junction with a conductor of the metal, passing an electric current through the at least two conductors, and measuring that current.

9 Claims, 20 Drawing Sheets

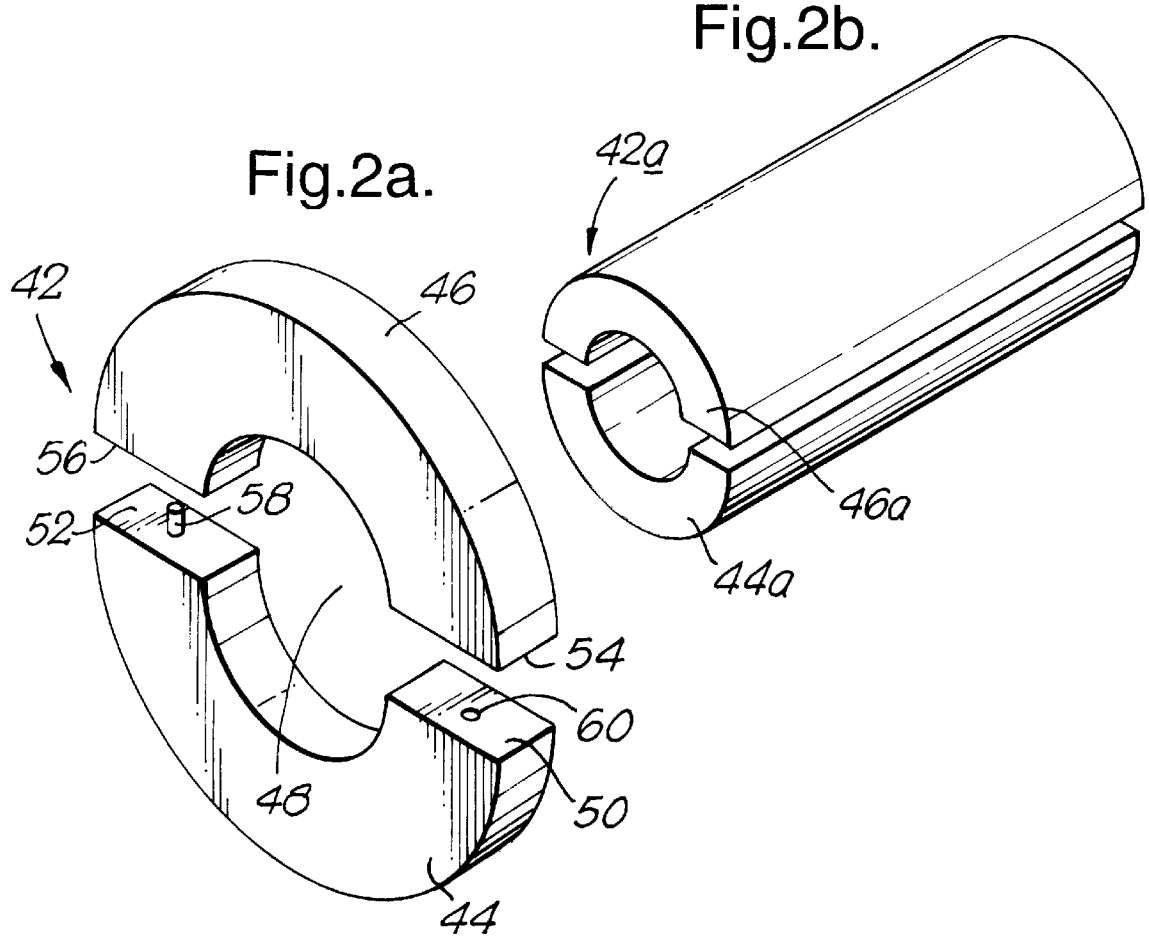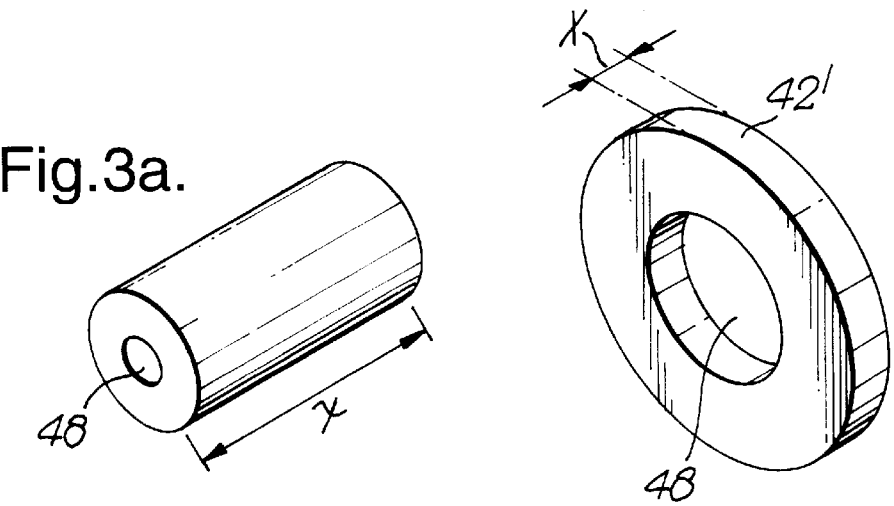

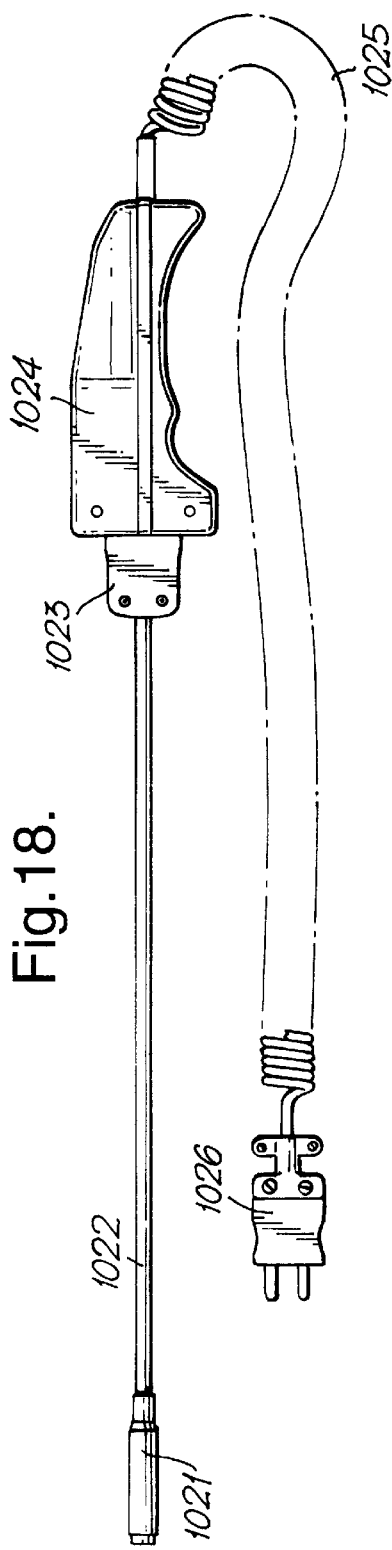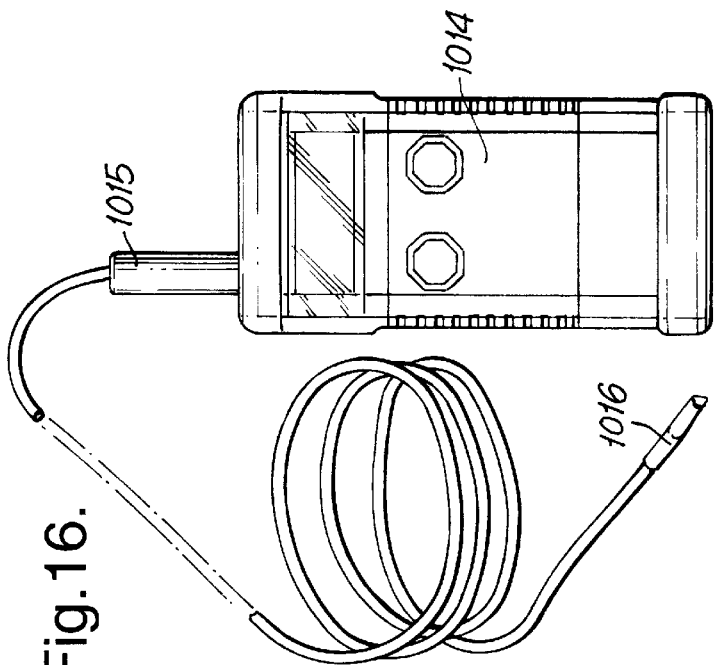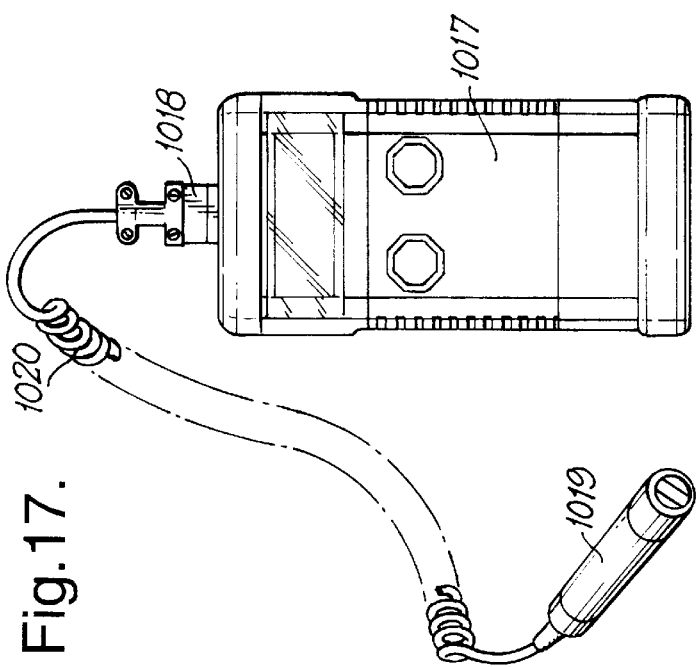
Fig. 18.
Fig. 16.
Fig. 17.

Fig.21.
Fig.25.
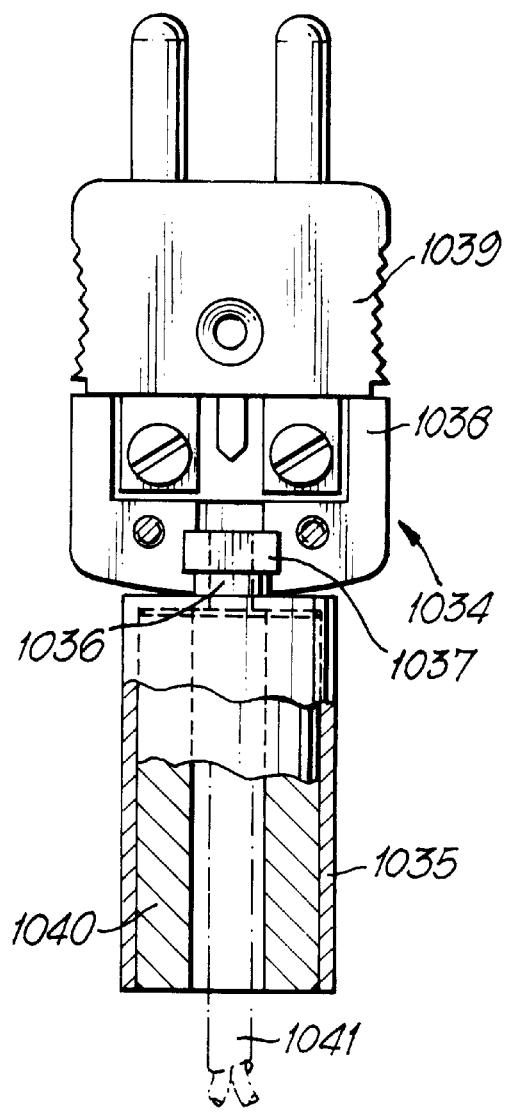
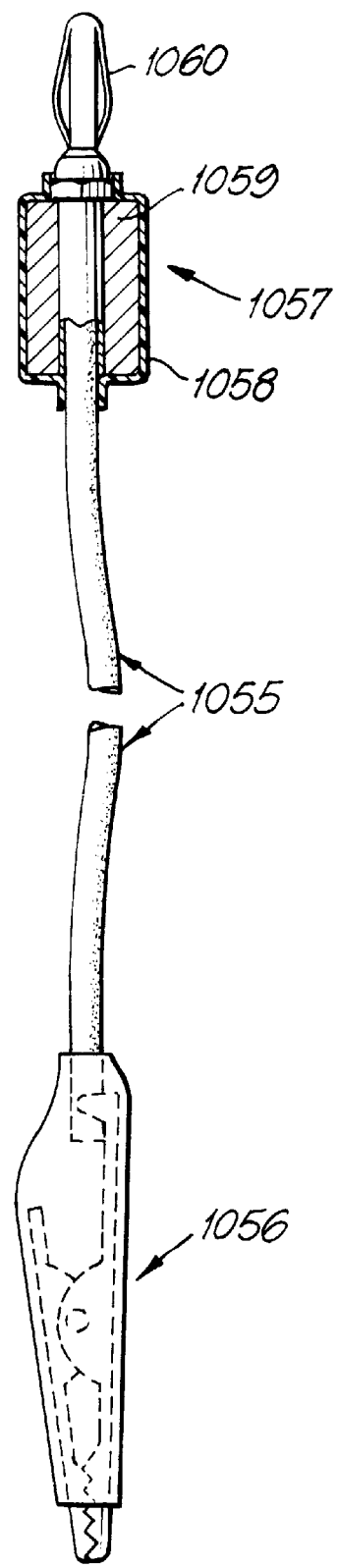

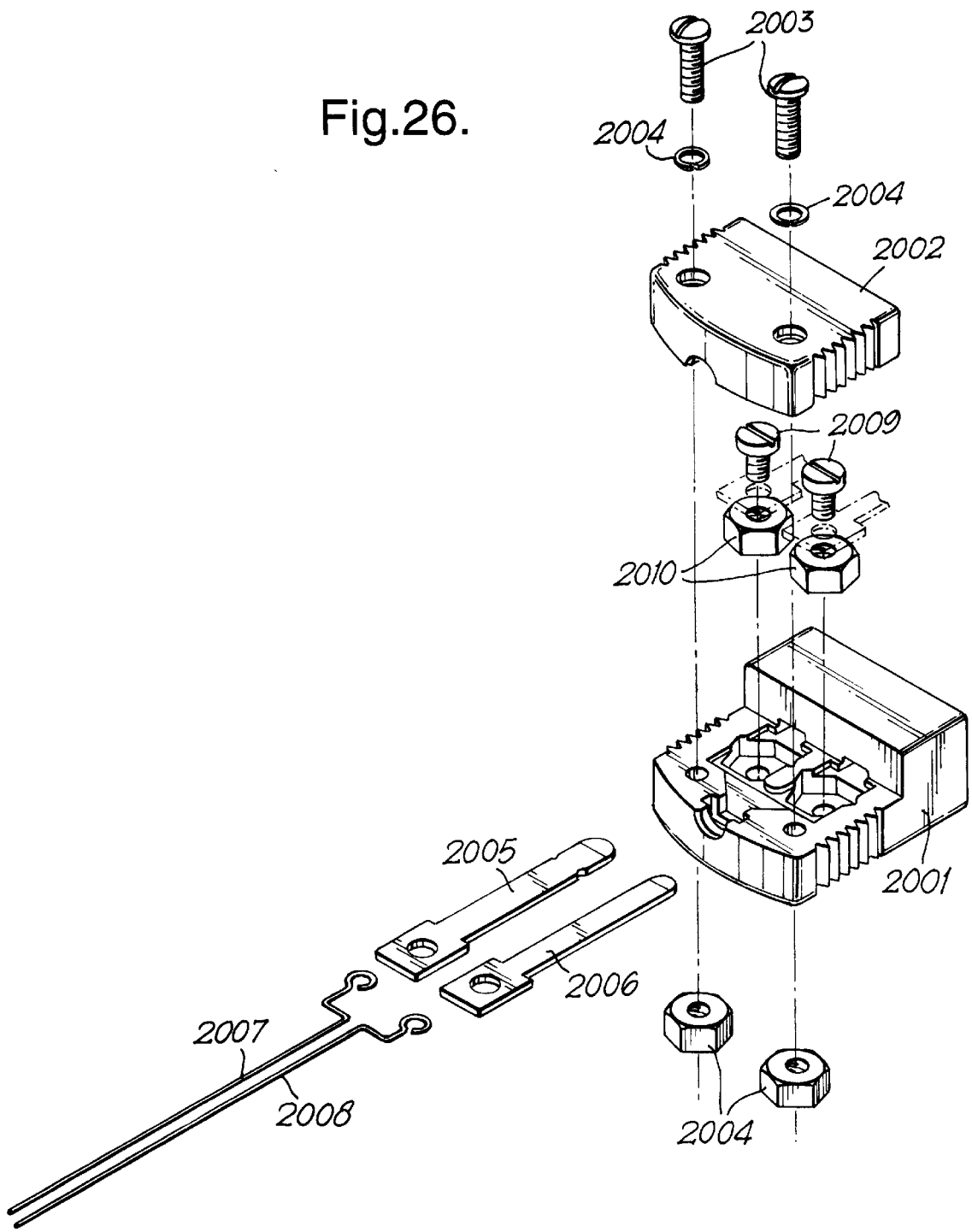

ANTENNA-EFFECT SUPPESSOR METHOD AND DEVICE PARTICULARLY FOR THERMOCOUPLES AND OTHER DISSIMILAR METAL CONDUCTOR COMBINATIONS

This application is a Continuation-in-part of U.S patent application Ser. No. 08/605,607 filed Feb. 22, 1996, now abandoned.

This disclosure contains no right to any invention made under federally-sponsored research and development.

BACKGROUND OF THE INVENTION

1. Field of the Invention

This invention relates generally to electrical devices such as multi-part plug and socket assemblies, switches, feed throughs, test leads, signal wires, and relays, and more specifically relates to electrical devices that incorporate an antenna-effect inhibiting feature to protect signals carried by the device from electromagnetic and/or electrostatic discharge type interference.

The invention relates further to protecting electrical circuits from receiving electromagnetic or electrostatic discharge interference which might be induced in conductors leading to the electrical circuit. More specifically the invention relates to electrical connectors which provide for suppression of electromagnetic or electrostatic discharge interference by means which form part of the connector itself or as an accessory thereto.

This invention applies to the fields of use wherein there is necessity for including an electrical device in a low level signal circuit, e.g. a thermocouple sensor, and provides a new apparatus for eliminating undesired electromagnetically-induced or electrostatic discharge type stray signals.

2. Description of the Prior Art

In the prior art of connectors there are disclosures of the use of ferrite material in the following:

(I) U.S. Pat. Nos. assigned to AMP Inc: 4,699,590, 4,359,620, 3,789,263, Re29,258, 3,735,705, 3,987,380, 4,936,800.

(II) U.S Pat. No. assigned to The Whitaker Corp: 5,219,305.

(III) U.S. Pat. No. William Baird Fritz 3,743,978.

(IV) U.S. Pat. No. assigned to Stanford Research Institute and Amplex Corporation: 3,533,948.

(V) Un-examined Japanese Patent Application, AMP Inc., 90-032246/05 JO 1279-584-A discloses an electrical connector which has a noise filter with a ferrite head fitted to a terminal lead formed by a central conductor of a feedthrough capacitor.

(VI) German Patent assigned to AMP Inc., Auslegeschrift No. 2,058,419 discloses a method for the manufacture of a high frequency filter from a ferrite tube, which is in the form of a highly compressed tube and which is bonded on its outer surface with a covering of dielectric material, the layer of dielectric material carrying an electrode in the form of a metallic outer sleeve, and a further electrode is provided in similar manner on the inside of the ferrite tube, characterised in that the covering (6) of dielectric material is laid down directly onto the outer surface of the ferrite tube (5) by electrophoresis.

SUMMARY OF THE INVENTION

It is known that electrical signals carried by connectors, or adjacent apparatus, may be subject to electromagnetic interference as the result of induced signals picked up from the radiation of adjacent electrical equipment. Such interference results from leads acting as an antenna that senses stray electromagnetic radiation; accordingly, the sensing of stray signals in this manner is known as the "Antenna-effect". Various efforts have been made to avoid or suppress the result of the antenna-effect, but such efforts have been found to be inconvenient and/or expensive to implement, or both.

For example, it has been found in the past that antenna-effect stray signals can be avoided by encapsulating leads in sheaths of magnetic-shielding sheet material, or by determining the strength of nearby stray signal fields and then moving all such nearby sources to a physical distance from the leads that has been calculated to prevent the possibility of undesired signals being picked up by electromagnetic induction. It can be seen, readily, that such preventive methods and techniques are indeed costly and inconvenient. Other attempts to reduce or avoid antenna-effect stray signals have involved the use of ferrite cores. However, until now such uses have required additional circuit elements, such as insertion of a jumper cable, having a permanently included ferrite core, in series with the main conductors in the circuit; or, awkwardly and inconveniently surrounding one or more of the circuit conductors with separately applied ferrite cores.

It is established practice, in industries that make use of thermocouple sensors, to couple the sensor into a related electrical circuit by means of an electrical connector. When for example thermocouples are connected to instruments such as panel meters, controllers and transmitters, the input signal from the sensor or transducer usually travels substantial distances along fine gauge electrically conductive wire leads. The length and nature of such leads and the environment in which they must function often create conditions that favour occurrence of the antenna-effect. In many cases, the leads or signal wires from a sensor or thermocouple are first attached, for convenience, to an electrical connector, for coupling to an instrument or the like. As soon as the conductors of the connector are electrically coupled to the circuit, a potential antenna is created. Of particular importance are thermocouple connectors which are particularly susceptible to the antenna-effect because of the long lead conductive path of the conductors themselves and the high input impedance of the instrumentation.

The term "ferrite", as commonly understood in the electronics field, denotes a particulate material having one or more oxides of iron in particulate form in a carrier such as a plastics material. This usage of the term "ferrite" is to be distinguished from the usual dictionary definition which is a generic name for a number of oxides of iron. In this specification, the term "ferrite" is to be understood as including within its scope any suitable material having an absorption and/or shielding effect as concerns electromagnetic waves which may be emitted at or adjacent to a zone of completion of an electrical circuit. Known ferrite elements consist of ferrite material sintered into a convenient shape. Other known "ferrite" materials for the suppression of electromagnetic interference are nickel-zinc compositions and manganese-zinc materials, of different compositions to permit selection of an optimum type for a given application; pressed parts, components, and powders are known.

OBJECTS OF THE INVENTION

Accordingly, it is an object of this invention to provide means associated with an electrical device that is capable of avoiding stray signals that may be induced in the leads of the device.

It is another object of this invention to provide an apparatus for eliminating the effects of undesired stray signals in circuits, that is uncomplicated in design, and that is simple and relatively inexpensive to produce.

It is still another object of this invention to provide means associated with an electrical device for eliminating the effects of undesired stray signals in its circuits, that is easily adaptable to single-wire or multi-wire connections.

Another and further object of this invention is to provide means associated with an electrical device for eliminating the effects of undesired stray signals in its circuits, that can be manufactured easily in various configurations to accommodate differing circuit requirements.

And yet another and further object of this invention is to provide means associated with an electrical device for elimination of the effects of undesired stray signals in its circuits in which operative elements of the device may be configured to facilitate insertion and removal of wire conductors.

A further object is to provide a method for the formation of a twin, or other multiple, wire arrangement, such as a thermocouple, assembly with a housing composed wholly or mainly of ferrite material, for example by molding or machining.

A further object is to provide a single wire arrangement, e.g. for a "banana" type plug and a method of incorporating the single wire in a housing composed wholly or mainly of ferrite material, for example by molding or machining.

Other objects are to provide:

(A) In an electrical device e.g. a plug and socket, a switch or a relay, which includes at least two contact members with respective surfaces, for bringing into contact to establish an electrical connection, antenna-effect inhibiting means disposed adjacent to the connection surface of at least one said contact member.

(B) An electrical device wherein said antenna-effect inhibiting means is a ferrite element, as defined herein.

(C) An electrical device wherein said at least one contact member is one part of a multi-part plug and socket connector.

(D) An electrical device wherein said antenna-effect inhibiting means is incorporated as a structural element of said device.

(E) An electrical device wherein said antenna-effect inhibiting means is a module separably incorporated with said device, or attachable thereon.

(F) An electrical device wherein said antenna-effect inhibiting means surrounds said connection surface, and particularly may be a multi-part element assemblable about said connection surface.

(G) An electrical device wherein said antenna-effect inhibiting means is incorporated in said one contact member, or forms a housing for said at least one contact member (e.g. by forming the housing from ferrite).

(H) A method of making a connector, for at least one metal element, having a connector shell of ferrite material about said element or elements, made for example by molding or machining.

(I) A further object is to provide a connector, for one or a plurality of wires, wherein the or each wire is connected to a terminal via a signal actuated means, for example, a signal modifying means and/or a signal indicating means, and wherein the signal actuated means and its connections to the or each wire and to the or each terminal are housed wholly within a ferrite body.

DESCRIPTION OF THE PREFERRED EMBODIMENTS

In one form of this invention the electrical device includes two or more discrete contact members with respective surfaces for bringing into contact to establish an electrical connection, and has respective antenna-effect inhibiting means disposed adjacent to the respective connection surface of each said contact member.

A feature of this invention is the provision for association with an electrical device of a signal inhibiting ferrite element that surrounds a wire lead intended for connection in a circuit, so as to prevent the propagation of stray signals through the device to undesired parts of the circuit.

It has been found that ferrite elements, when properly included in an electrical circuit, act as an electromagnetic "sponge" to absorb the unwanted electromagnetic wave energy and to reduce or eliminate the antenna-effect of the conductors with which the ferrite elements are associated.

Ferrite connector housing shells may be formed by molding or machining ferrite compositions.

Further, a method of making a connector, for two wires of dissimilar metals, comprises forming a connector shell of ferrite material embracing both of said wires.

Further in accordance with the invention, a method of making a connector, comprises forming a connector shell of ferrite material about a metal element.

Still further, a method of making a connector, for at least one metal element, comprises molding a connector shell of ferrite material about said at least one metal element.

In another method of making a connector, for at least one metal element, there is provided ferrite material which embraces said at least one metal element, and which is machined to shape.

The invention further provides a connector, having at least one metal element therein, comprising a body of ferrite material molded about said at least one metal element.

The invention still further provides a connector, having at least one metal element therein, with ferrite material embracing said at least one metal element and machined to shape.

BRIEF DESCRIPTION OF THE DRAWINGS

These and other and further objects, features and advantages of this invention will be made apparent to those having skill in this art, by the following specification considered with reference to the accompanying drawings, in which:

FIGS. 2*a* and 2*b* are a pictorial representations of two modified forms of the ferrite element used in the device of FIG. 1;

FIGS. 3*a* and 3*b* are a pictorial representations of other forms of ferrite element that can be used in this invention;

FIG. 16 is an elevation of a test meter having, for example, a thermocouple probe connected to it by a twin-core lead which is enclosed, at its point of entry to the meter, by an antenna-effect inhibiting sleeve.

FIG. 17 is an elevation of a test meter in which the twin-core lead is connected by a two-pin plug incorporating an antenna-effect inhibiting sleeve.

FIG. 18 is an elevation of a test probe, with twin core lead, wherein an antenna-effect inhibiting member, such as a sleeve or a collar, is provided both where an elongated probe joins a handle, and where a two-core lead joins a two pin plug.

FIG. 21 is a partially sectioned view of a two-pin plug to show both an internal collar, and an external sleeve, adapted to surround the wire leads to its terminal pins.

FIG. 25 is a partially-sectioned view of a single-conductor lead having at one end a crocodile clip, and at the other end a banana plug.

FIG. 26 shows, with the components thereof in separated condition, a first form of two-pin male connector having a body structure of ferrite material.

DETAILED DESCRIPTION OF THE INVENTION

Figure 1:
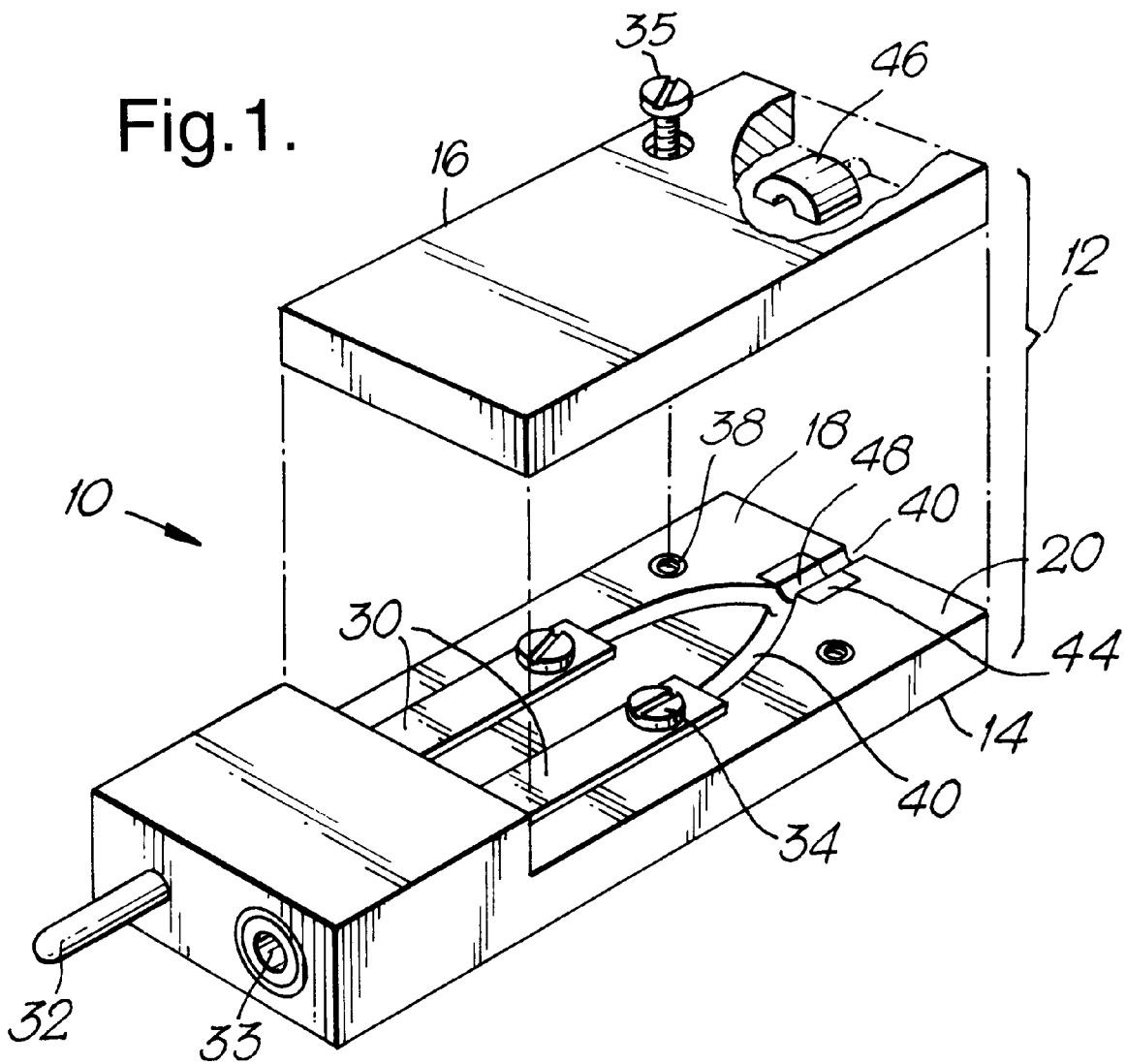
FIG. 1 is a partially cut-away pictorial representation of one embodiment of an electrical device module and ferrite element in accordance with this invention.

Referring now more specifically to the drawing, FIG. 1 may be seen to illustrate a device including a ferrite element in accordance with this invention in which the connector device 10 comprises a housing 12 of insulating (e.g. ferrite composition) material having a first separable housing portion 14 and a second separable housing portion 16 that are configured to engage each other about a common separation plane 18 that extends in substantially parallel, co-planar relationship with a contact-element supporting face 20 on first housing portion 14. A pair of contact elements 30 are mounted on the housing, although it is considered obvious that just one or substantially more than two contact elements may be mounted to the housing if desired. Similarly, although the contact elements 30 shown in FIG. 1 are of the type commonly identified as male contact elements, it is considered obvious that other types of contact elements, such as the female contacts shown and described elsewhere in this specification, may be used in lieu of the male contacts, without departing from the spirit and scope of this invention. In FIG. 1, one of contact elements 30 includes near one end a male end portion 32, and the other contact element includes near a corresponding end, a female contact receptacle portion 33. Both the male and female contact portions 32 and 33 are adapted electrically and mechanically to engage a mating external conductor (not shown) in any obvious and well-known manner; in this case, it is apparent that the mating external conductors would be a mating female contact element for male contact portion 32 and a male contact element for female contact portion 33. External conductors having these conventional shapes, will electrically and mechanically engage male contact portion 32 and female contact portion 33 in a manner well known to those having skill in the electrical connector art.

Each electrical contact element 30 further includes, at the opposite end remote from the male and female contact portions shown, a screw terminal 34 for electrically coupling the contact 30 to a second external conductor (not shown). For this purpose, the second external conductor may have any suitable form, such as flexible insulated electrical wire, that is suitable for coupling to, i.e. electrically and mechanically engaging, screw terminal 34, so as to establish an electrical path extending through and away from connector 10, via contact 30 and the external conductor. Contact 30, and any external conductors to which it is coupled, together form an electrical path extending through and away from the housing 12.

The two separable portions 14 and 16 of housing 12 are secured together by any convenient fastening means, such as one or more fastening screws 35 and mating threaded bores 38. Portions 14 and 16 preferably are secured together after screw terminals 34 have engaged one or more external conductors to contact element or elements 30, so as to provide a cover for each screw terminal connection and to form a unified connector housing 12.

Housing portion 14 includes a conductor guide groove 40 that serves to constrain and to guide an external conductor from screw terminal 34, out of and away from housing 12. Along the portion of the path represented by the groove 40, a first part 44 of a toroidal ferrite core element 42 (shown in FIG. 2) is secured to holding portion 14, as by gluing, force-fitting, molding or any other suitable means, into the electrically insulating material of the housing. The second part 46 of ferrite core element 42 is secured to housing portion 16 in any similarly convenient manner, in position to mate with first part 44 so as to form a complete toroidal structure, having a conductor passage 48 extending there through as shown in FIG. 2, when housing portions 14 and 16 are fastened together as by fastening screws 35.

The ferrite core members 42 illustrated in FIGS. 2a and 2b are intended to illustrate the characteristic toroidal and cylindrical shape of such cores. In this particular embodiment, the core 42 or 42a is divided into two halves, 44, 46 or 44a, 46a which together form respectively a complete toroid or cylinder shape. The end faces 50, 52 and 54, 56 of the core halves 44, 46 may be provided, as shown in FIG. 2a, with mating projections 58, and receptacles 60, to help align and maintain the relative positions of the two halves when they are brought together in mating relationship. The division of core 42 into two halves 44, 46 accommodates the particular design and uses of the connector illustrated in FIG. 1, but it should be understood that other ferrite element configurations can be used in connectors constructed in accordance with this invention, including unitary one-piece elements as illustrated respectively in FIGS. 3a and 3b. A conductor passage here shown as passage 48, is to accommodate a portion of the axial length of a conductive path along which electrical signals will be transmitted.

In the connector device embodiment illustrated in FIG. 3b, the axial length dimension X, of the ferrite element 42', is shown to be comparatively short relative to the diameter of the conductor passage 48. It should be recognised, however that dimension X may be increased by any desired amount, so that the shape of element 42 or 42' may eventually more nearly represent a tube as in FIG. 3a, rather than a doughnut-shaped torus. For the purpose and uses of this invention, both tubular and toroidal shapes may be used, and either shape may be either unitary as shown in FIGS. 3a and 3b, or divided into separable sections as suggested in FIGS. 2a and 2b.

Although the terms "toroid" and "cylindrical" have been used in this description with reference to FIGS. 2a and 2b and 3a and 3b it will be understood that other enclosing bodies may be used having a regular or irregular curved or polygonal cross-section, and that the nature of the cross-section may change along the length of the enclosing body.

Figure 4:
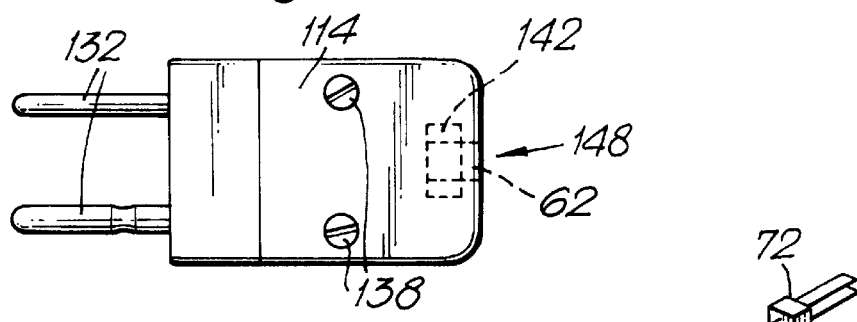
FIG. 4 is a plan view of a different form of device including a ferrite element in accordance with this invention.

FIG. 4 illustrates, for purpose of completeness, an electrical connector device assembly having a pair of male contact members 132 extending from a two piece housing 114 in which a unitary ferrite element 142, of the type illustrated in FIG. 3a or 3b, is enclosed when the two parts of the housing are brought together and secured by one or more fasteners such as screw 138, in the manner described above with reference to the connector of FIG. 1. In this connector, one or more external conductors such as wire leads may be separably fastened to the ends of contact members 132 within the housing in the same or any similar manner described with reference to the connector in FIG. 1, so that such external conductors may be passed through the conductor passage 148 of element 142 and extended outwardly from housing 114 via an exit passage 62 corresponding generally to exit passage 40 of FIG. 1.

Figure 5:
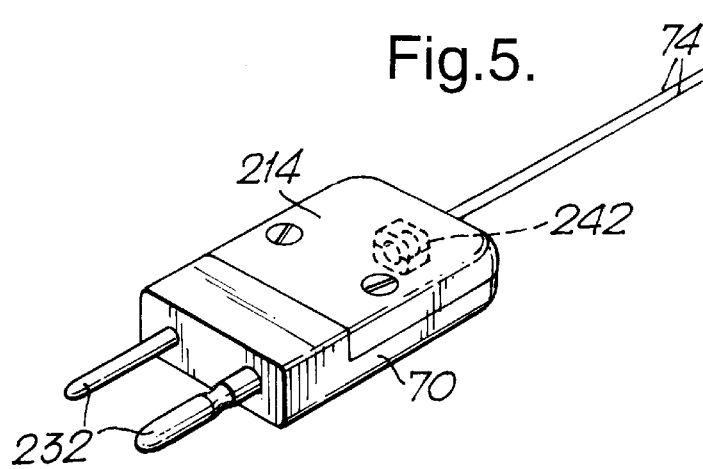
FIG. 5 is a pictorial representation of an embodiment of an electrical device including a ferrite element in accordance with this invention, having an integral wire conductor lead.

FIG. 5 illustrates an electrical connector device 70 including a ferrite element in accordance with this invention pre-assembled to a thermocouple 72 by means of a pair of elongated wire leads 74 that may be made, typically, from dissimilar metal. It is known that dissimilar conductive leads in this configuration will heighten the antenna-effect pickup of stray electromagnetic signals. A connector permanently attached to the ends of such leads remote from the thermocouple device, accordingly will be found to be especially effective in eliminating the effects caused by such stray signals.

In this embodiment of the invention, the housing 214 supports a pair of electrical contact members having male contact portions 232 extending from the housing. Wire leads 74 are coupled to the electrical contacts of male portions 232 within the housing 214, and they extend outwardly from the housing after passing through an embedded ferrite element 242 within the housing. As explained previously in connection with the embodiment of the invention illustrated in FIG. 1, any number of associated conductors such as wire leads may be made to pass outwardly away from the housing through an appropriately-sized internally-positioned element 242.

Figure 6:
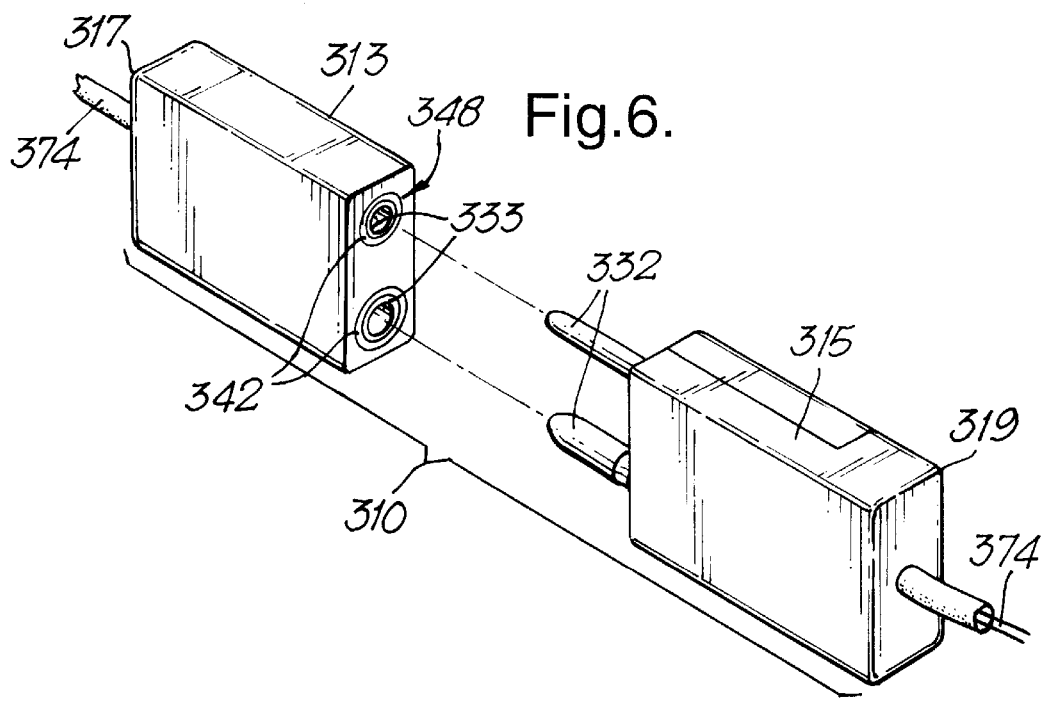
FIG. 6 is a pictorial representation of an embodiment of this invention including a separable, two-piece electrical device.

FIG. 6 illustrates a two-part mating electrical connector device assembly 310 having a female half 313 and a male half 315, each having one or more wire leads 374 extending outwardly and away from their respective housing members 317 and 319. Female connector portion 313 includes a pair of electrical contacts having female receptacle portions 333 mounted to the housing and male connector portions 315 includes a pair of electrical contacts having male contact portions 332. The contacts may be mounted to the housing in any known manner as previously described, and wire leads or other suitable forms of external conductors may be electrically coupled to the electrical contacts within the housing, also in any known manner. In connector housing half 313 the tubular-shaped female receptacle portions 333 are each surrounded by ferrite elements 342 which may be either toroidal or tubular in shape. The elements 342 are made to surround the female portions 33 by extending their tubular bodies through a conductor passage 348 in each element 342. It can be seen readily that this structure affords the advantage of immediately and effectively surrounding an axial portion of the length of the continuous electrical flow path that is formed when the male contact portions 332 are mated with the female contacts 333 in accordance with customary electrical connector usage.

Figure 7:
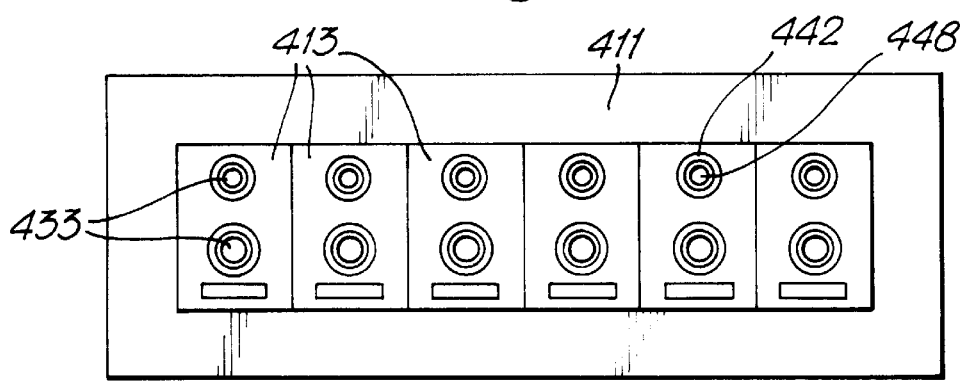
FIG. 7 is a front elevation view of female portions of a two-piece device such as is shown in FIG. 6, shown mounted in a multiple array in a panel.

In FIG. 7, a plurality of female connector devices 413 which may be similar or identical to connector halves 313 shown in FIG. 6, are mounted in substantially parallel, side-by-side array in a panel member 411. In the manner of the connector halves 313 shown in FIG. 6, each unit 413 includes a pair (or any desired number) of female contact portions 433, each surrounded by a ferrite element 442 having a central passage 448. This figure is intended to illustrate how a connector in accordance with this invention may be mounted for convenient use in multiple array. Suitable conductive leads may be internally connected to contact portions 433 and allowed to extend outwardly away from connectors 313 in a rearward direction. For the purpose of clarity it is noted that the rearward direction extends beneath the plane of this drawing and the wire conductors, therefore, are not shown. When the connectors 413 are mounted in this manner in a supporting panel 411, they may be used readily and conveniently to couple with any suitable form of external conductor that can be inserted and/or withdrawn from the axial central openings XX within female contact portions 433.

Figure 8:
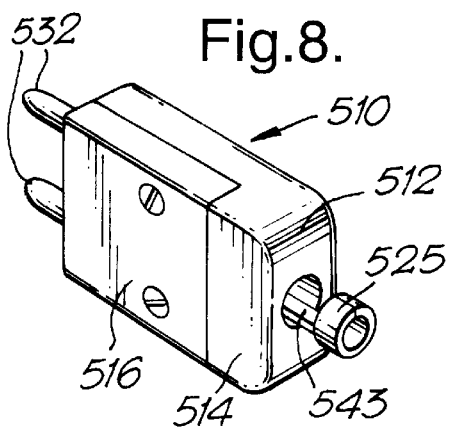
FIG. 8 is a pictorial representation of another embodiment of an electrical device including a ferrite element in accordance with this invention, illustrating the signal-inhibiting element mounted to a connector housing in external configuration.

In the embodiment of this invention illustrated in FIG. 8, a connector device 510 having a housing 512, with first and second separable portions 514 and 516, and a pair of male contact members 532 mounted thereto, further includes an externally mounted ferrite element 525 supported on the exterior of housing 512 by means of a support bracket 543 coupled to housing portion 514. It will be understood, however, that bracket 543 can be mounted readily to either housing half 514 or 516, within the scope of the invention. The bracket 543 may be made of metal or plastic, although plastic is preferable to preserve the conductive symmetry of the element so as to optimise the capture of stray electromagnetic signals.

Figure 9:
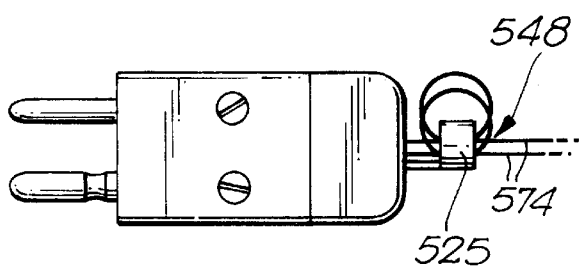
FIG. 9 is a plan view of the electrical connector of FIG. 7, showing an alternate arrangement for extending a wire lead from the device.

FIG. 9 illustrates the connector of FIG. 8 in which external conductors 574 in the form of lead wires extending away from the connector housing 514 have been looped through the externally mounted element 525 so that they pass through the conductor passage 548 in the element at least twice instead of merely once. It has been determined that this looped configuration can provide enhanced antenna-effect signal absorption when desired.

Figure 10:
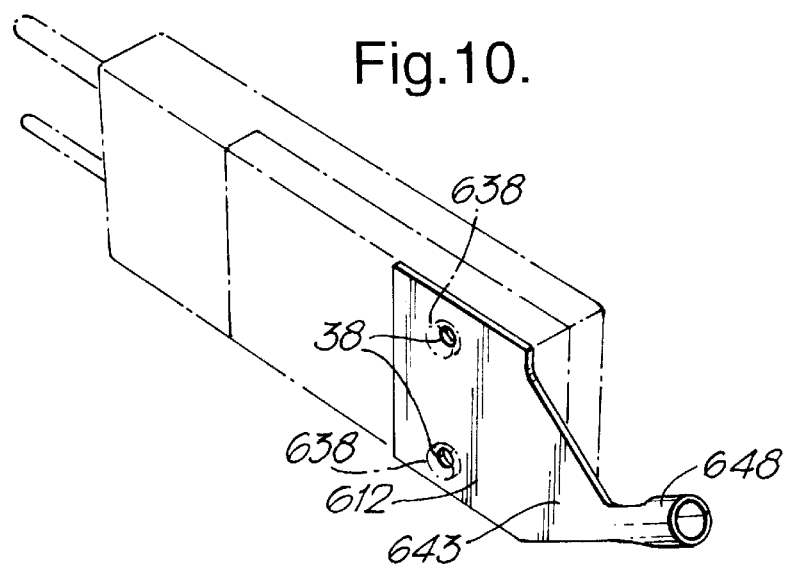
FIG. 10 is a pictorial representation of another embodiment of an electrical device including a ferrite element in accordance with this invention, illustrating the signal inhibiting element mounted in an external retro-fit configuration on an existing device that did not incorporate a ferrite element in its original construction.

FIG. 10 illustrates an alternate form of construction for the connector device of FIGS. 8 and 9, in which an externally mounted element 648 is supported by a bracket 643 that is separately attached to the exterior of the connector housing 612. The means of attachment may be known separable mounting means such as, for example, a pair of screws 638, that are threadedly engaged to threaded bores 38 first described herein with reference to FIG. 1. In this regard, it should be noted that a bracket 643 with an element 648 may be mounted, if desired, to the connector housing illustrated in FIG. 1, using the same fastening screws 35 (as shown in FIG. 1) to secure the bracket to the housing and to secure together the separable housing parts 14 and 16.

Figure 11:
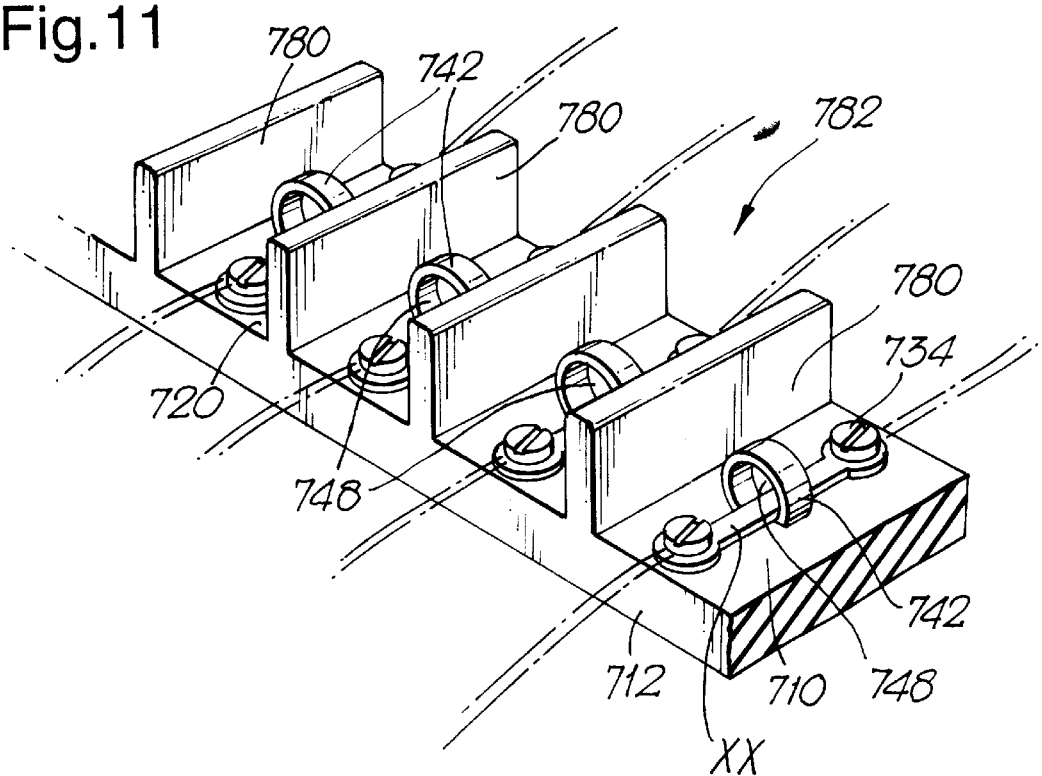
FIG. 11 is a pictorial representation of a device including a ferrite element in accordance with this invention, in the form of a terminal strip.
Figure 12:
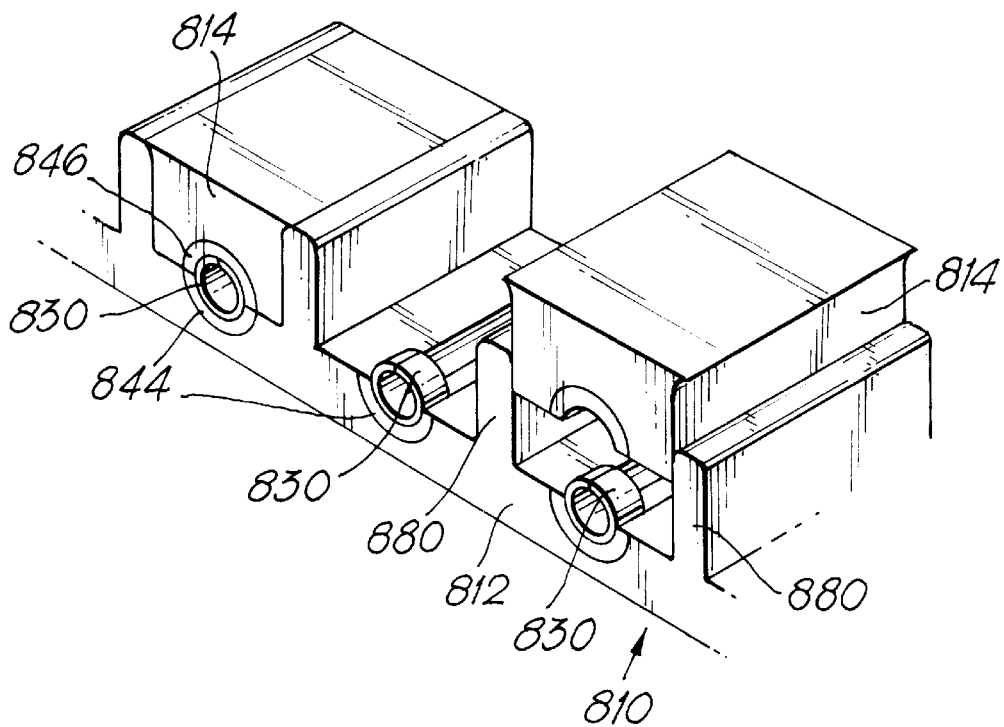
FIG. 12 is a pictorial representation of a different form of the terminal strip connector shown in FIG. 11.

FIGS. 11 and 12 illustrate embodiments in accordance with this invention in the form commonly identified in the electrical connector industry as terminal strips. The terminal strip connector 710 of FIG. 11 comprises a housing 712 of insulating material having a plurality of parallel spaced-apart barrier walls 780 extending from a contact supporting surface 720 on one side of the strip. In each space 782 between adjacent barrier walls 780, a metallic contact XX of generally known design and function is mounted on or in surface 720, in whole or in part. Each such contact XX may have for example, a screw terminal 734 threadedly engaged to the conductive material of the contact for separately securing an external conductor, such as a wire lead, electrically and mechanically to the strip; when a separate wire lead is connected to the screw terminals at each end of a contact strip XX, a continuous electrical path is established from one external conductor to the other through the contact strip XX and extending outwardly and away from the terminal strip in two directions. It will be understood, of course, that electricity will be assumed to flow, according to convention, primarily in one direction through the path thus established. In accordance with this invention, in each space 782, an element 742 having a conductor passage 748 is mounted to the body 712 of terminal strip connector 710, so that the corresponding contact strip XX extends through the conductor passage 748 with the screw terminal portions 734 at opposite ends of the contact XX being positioned on axially opposite sides of the ferrite element 742. In this manner it will be understood readily by those having skill in this art, that the continuous electrical path extending though the contact element XX will also extend through a ferrite element 742, thus providing an improved terminal connector strip in which each connected wire lead will benefit from the antenna-effect suppression of the core without requiring any additional structure or additional serially connected wire leads.

FIG. 12 illustrates a modified form of a terminal strip connector device 810, in which the housing member 812 further includes a separable cover portion 814 that is configured to be separably retained between pairs of adjacent, spaced-apart barrier walls 880 in any convenient manner, such as interference fit or inter-engaging projections and retention shoulders (not shown) of well-known design. A ferrite element divided into two parts 844 and 846 is positioned with part of the element in the housing body 812 and the other part in the cover member 814, such that when the cover is engaged to the housing, the element parts 844, 846 will come together in alignment to form a complete element surrounding a corresponding contact element 830. This configuration may be particularly advantageous when it is necessary and desirable to provide enlarged (in diameter or in length or both) elements to surround paths that may be especially susceptible to stray electromagnetic signals of an undesired nature.

Figure 13:
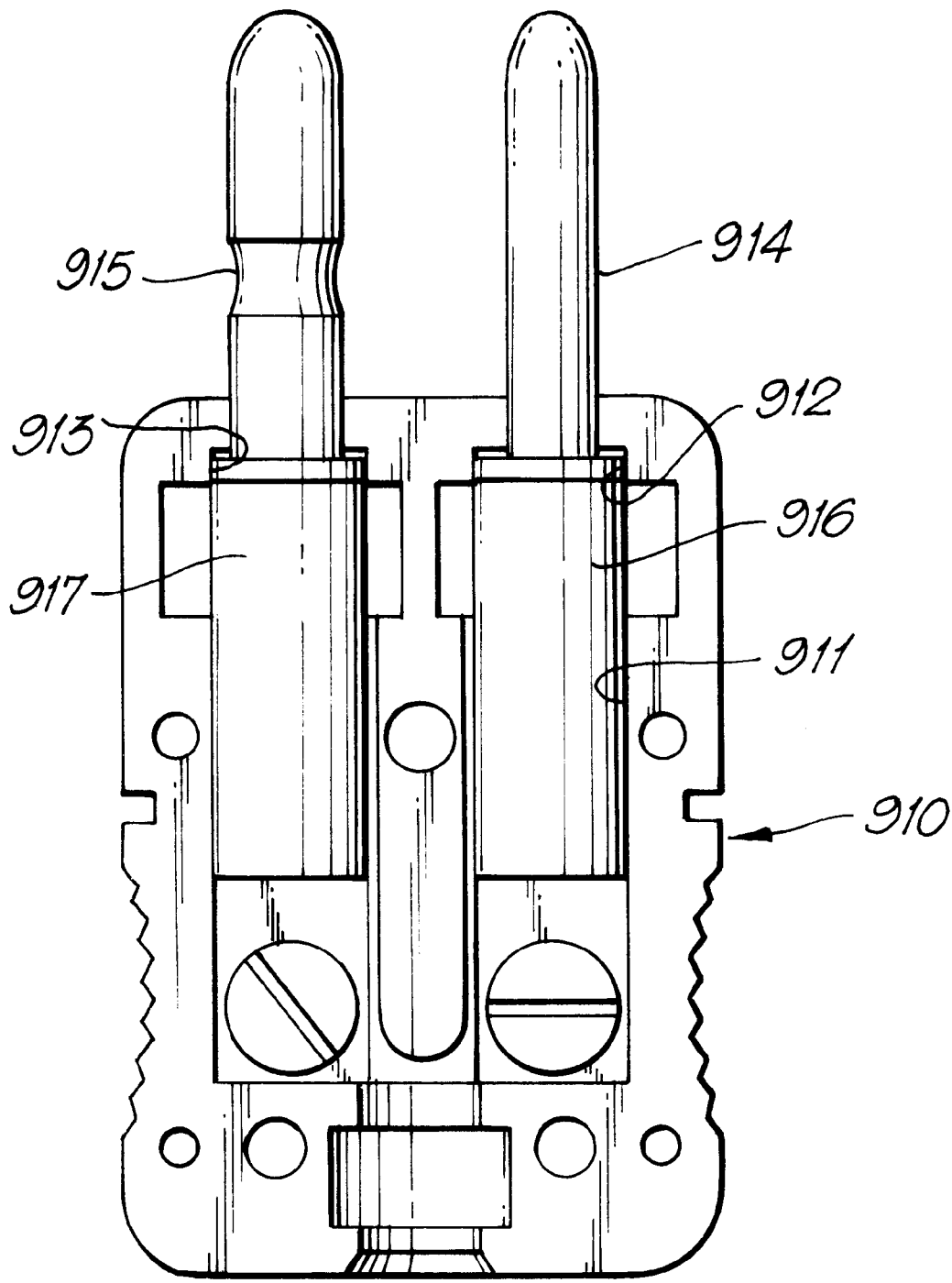
FIG. 13 shows a male plug with split ferrite sleeves on each pin.

In FIG. 13 the half casing 910 is recessed as at 911, 912 and 913 to receive and locate male pins 914 and 915, each of which has an intermediate portion along its length made of reduced diameter so as to receive and locate a respective ferrite sleeve 916, 917 which is split longitudinally.

Figure 14:
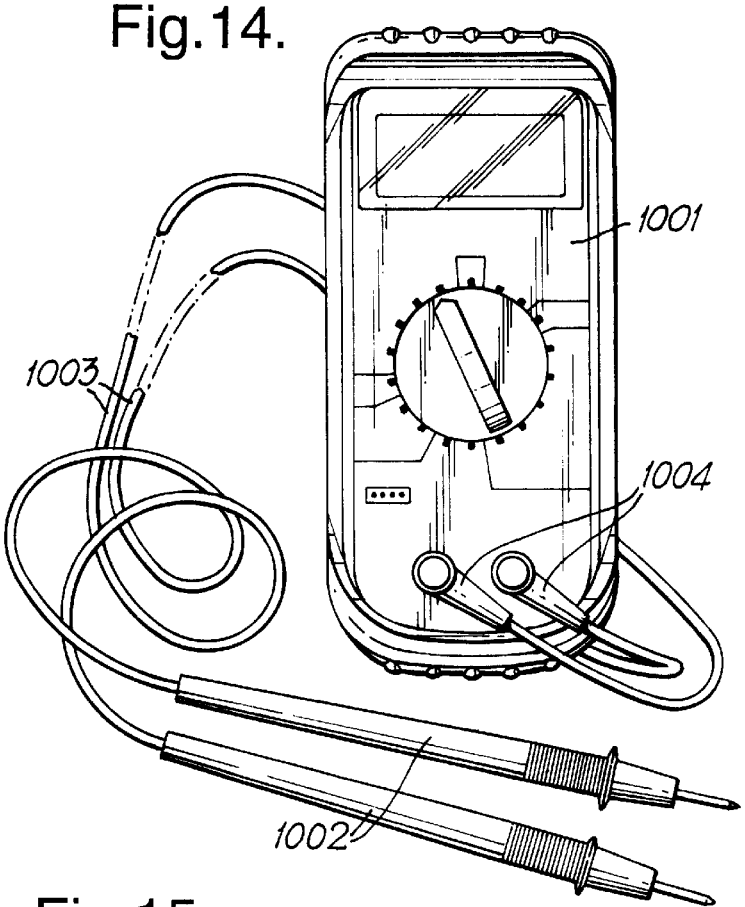
FIG. 14 is an elevation of a representative test meter having a pair of leads in each of which there is an antenna-effect inhibiting means incorporated at the juncture of the lead with the meter.

Referring to FIG. 14 there is shown a representative test meter 1001 having associated with it two test probes 1002 connected by respective leads 1003 to fixed or removable connectors 1004. Antenna-effect inhibiting collars or sleeves, for example as described above with reference to any of the preceding figures, are enclosed within the probes and/or the connectors, and encircle the conductors therein.

Figure 15:
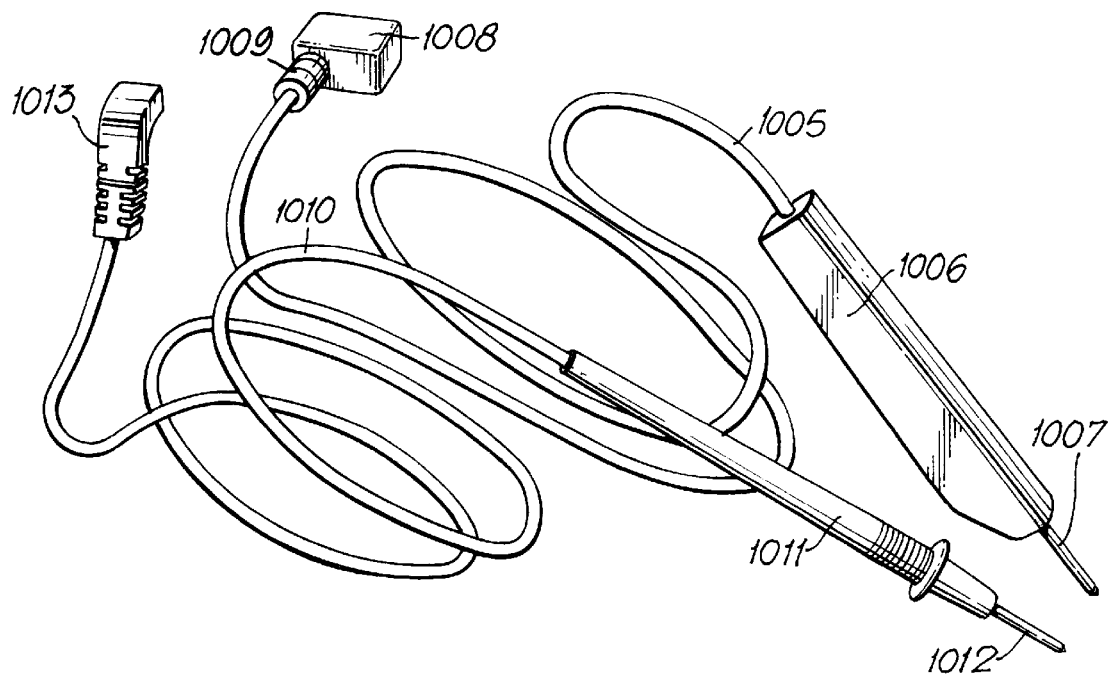
FIG. 15 is an elevation of two leads, for use with a test meter, each having a different form of connector to engage with terminals of a meter (not shown).

Referring to FIG. 15 there are shown two conductor leads 1005 and 1010. Lead 1005 has at one end a handle 1006 with probe 1007, and at the other end a first kind of plug or socket connector 1008 on which is included an antenna-effect inhibiting collar 1009. Lead 1010 has at one end a handle 1011 with probe 1012, and at the other end a different form of plug or socket connector 1013 in which there is an antenna-effect inhibiting collar or sleeve (not shown), as described above with reference to any of the preceding figures.

In FIG. 16 a meter 1014 receives a connector 1015, for a thermocouple 1016, which includes an antenna-effect inhibiting member (not shown) which is of the kind referred to in the preceding figures, see especially items 916, 917 of FIG. 13, arranged about both wires.

In FIG. 17 a meter 1017 receives a removable connector 1018 for a probe 1019 with lead 1020. A collar or sleeve, of antenna-effect inhibiting means, as described above, is disposed with the connector 1018 about at least one of the conductors therein.

In FIG. 18, a thermocouple device includes a probe 1021 having two conductors (not shown) which pass through a stem 1022 to a connector plug 1023 removably connected to a handle 1024 at the end of a twin lead 1025 terminating in a two pin plug connector 1026. An antenna-effect inhibiting collar or sleeve, as described precedingly herein, is disposed within the connector plug 1023 and about the conductors therein. Alternatively, or in addition, an antenna-effect inhibiting collar or sleeve, as described precedingly herein, is disposed within the two pin plug connector 1026.

Figure 20:
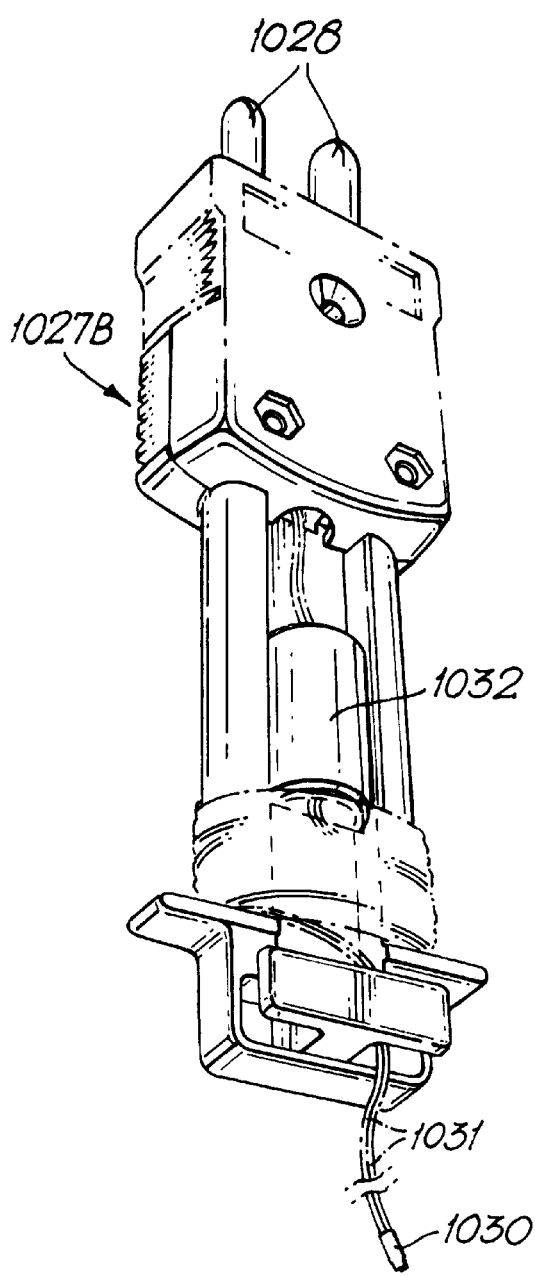
FIG. 20 is a perspective view of a completely assembled plug, of the kind shown in FIG. 19, showing how the twin lead to the plug passes from the plug through the sleeve and is then stored temporarily by wrapping about the wire caddy.
Figure 19:
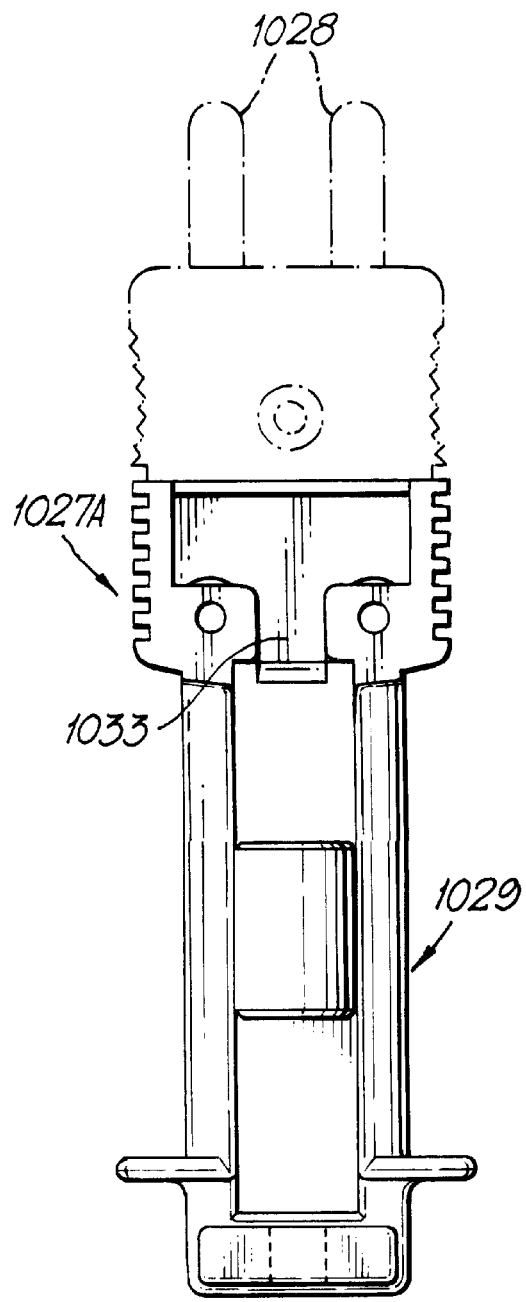
FIG. 19 is a partial elevation of a two-pin plug having incorporated therein a so called wire caddy which includes a sleeve of antenna-effect inhibiting material.

FIG. 19 and 20 are views of two embodiments of two pin connector 1027A and 1027B having at one end two pins 1028, and at the other end a wire caddy 1029. FIG. 20 shows a thermocouple 1030 having twin leads 1031 which are connected internally of the connector to respective pins 1028, and emerge from the connector 1027 to pass through a sleeve 1032 of antenna-effect inhibiting material. FIG. 19 is partially sectioned to show an internal double-radius collar or sleeve 1033 through which the leads (not shown) would pass.

FIG. 21 shows a two pin connector 1034 which receives a casing 1035 formed with a neck 1036 carrying a head 1037 by which the casing 1035 becomes locked to the connector body 1038 when a cover portion 1039 (shown partially cut away) is fastened in position. Within the casing 1035 there is positioned a sleeve 1040 of antenna-effect inhibiting material, through which passes a twin conductor 1041.

Figure 22:
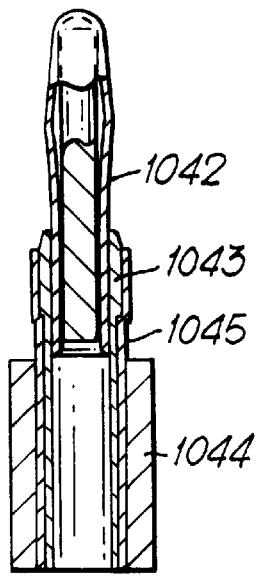
FIG. 22 is an axial section of a banana plug adaptor including a sleeve of antenna-effect inhibiting means.

Referring to FIG. 22 there is shown a "banana" plug having a metal pin portion 1042 about which is positioned a collar 1043 of antenna-effect inhibiting material secured on the body 1044 by a sleeve 1045.

Figure 23:
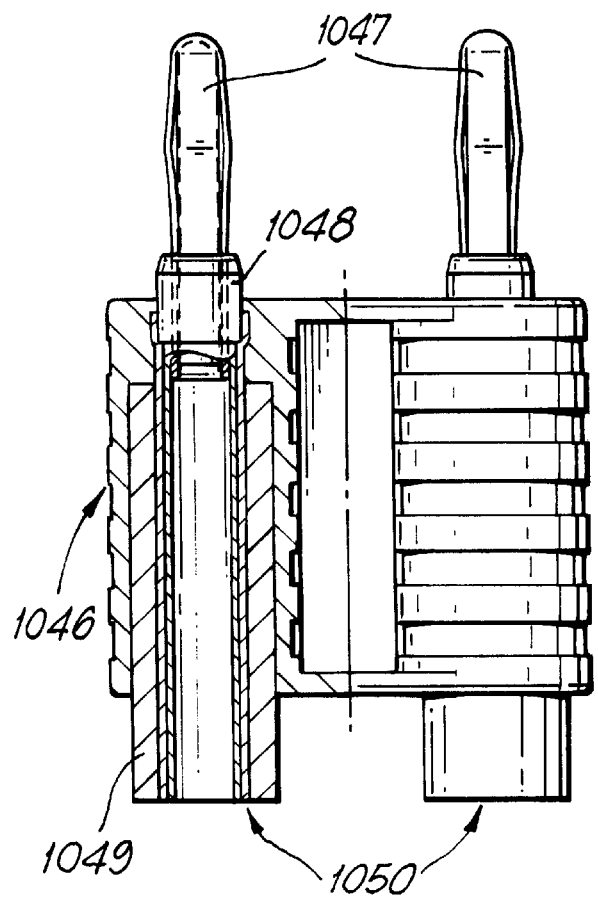
FIG. 23 is a partially sectioned view of a two-pin adaptor wherein each pin-and-socket assembly has a collar of antenna-effect inhibiting material about the pin portion of the assembly.

Referring to FIG. 23 there is shown a banana jack adapter 1046 having two metal pins 1047 each of which is encircled by a collar 1048 and by a sleeve 1049, both of antenna-effect inhibiting material, to inhibit such effect respectively where the pins 1047 coact with a socket (not shown) and where the sockets 1050 respectively coact with pins (not shown) of another component.

Figure 24:
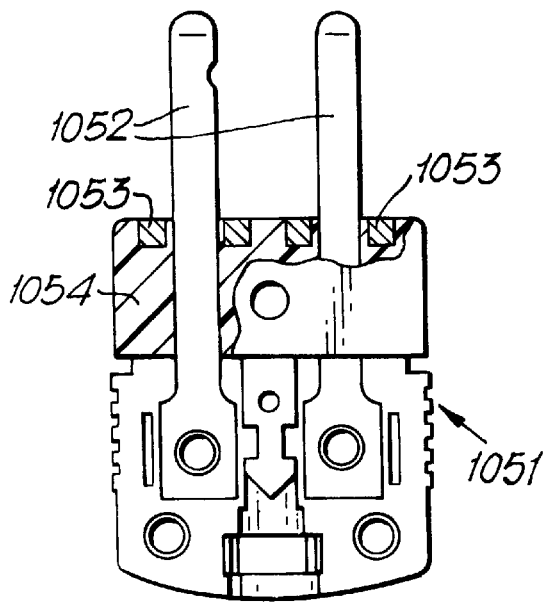
FIG. 24 is a partially-sectioned view of a two-pin plug assembly having a collar of antenna-effect inhibiting material about the entry for the leads, and also a further such collar about each pin.

Referring to FIG. 24 there is shown, with part broken away, a two pin connector 1051 having two pins 1052 each of which is encircled by a respective collar 1053 of antenna-effect inhibiting material housed within the general body 1054 of the connector.

In another useful arrangement a "multi-plug adaptor" comprises a conveniently shaped body, e.g. a cube, having at a plurality of its faces respective sets, e.g. pairs, of pins or sockets of various shapes and dimensions to enable the adaptor to engage with plug pins, or sockets, or leads or other adaptors or devices or components, to enable connection of otherwise non-matching items, some or all of the pins and/or sockets of the adaptor having associated antenna-effect inhibiting means such as collars, sleeves or other enclosing or mounting bodies.

In FIG. 25 there is shown a single-conductor lead 1055 having at one end a known crocodile clip 1056. At the other end there is a banana plug 1057 wherein a casing 1058 houses a sleeve 1059, of an antenna-effect inhibiting material, which surrounds the connector (not shown) which is attached to the plug terminal 1060. Antenna-effect inhibiting material, e.g. "ferrite", may be present in the banana plug and in the socket in which it is received.

The antenna-effect inhibiting means may be fitted to or applied on the or each contact member by methods including for example pre-forming said means and there after fitting it, e.g. by snap-fit, use of fastenings, or securing of portions of a whole about the contact member, or in another manner of application of the inhibiting material, e.g. by shrinking in position, or spraying it on, or by dipping the contact member in the inhibiting material or by enrobing, coating, lacquering or spraying.

The quantity, dimensions, shaping and other physical features of the inhibiting means may be selected before application, or modified after application, for enhancement of its effect, e.g. by tuning to a capacity and/or wavelength of operation suited to the kind of antenna-effect interference to be expected.

FIG. 26 shows a connector, for a thermocouple or a pair of wires of dissimilar metals, having a body of ferrite material with a lower part 2001 and an upper part 2002 which can be assembled by bolts 2003 and nuts 2004. Within the lower part 2001 there are formed recesses to receive pins 2005 to which wires 2007 and 2008 can be secured by bolts 2009 with nuts 2010. Thermocouples have an inherently high impedance, rarely less that 8 ohms, usually for long leads.

Figure 27:
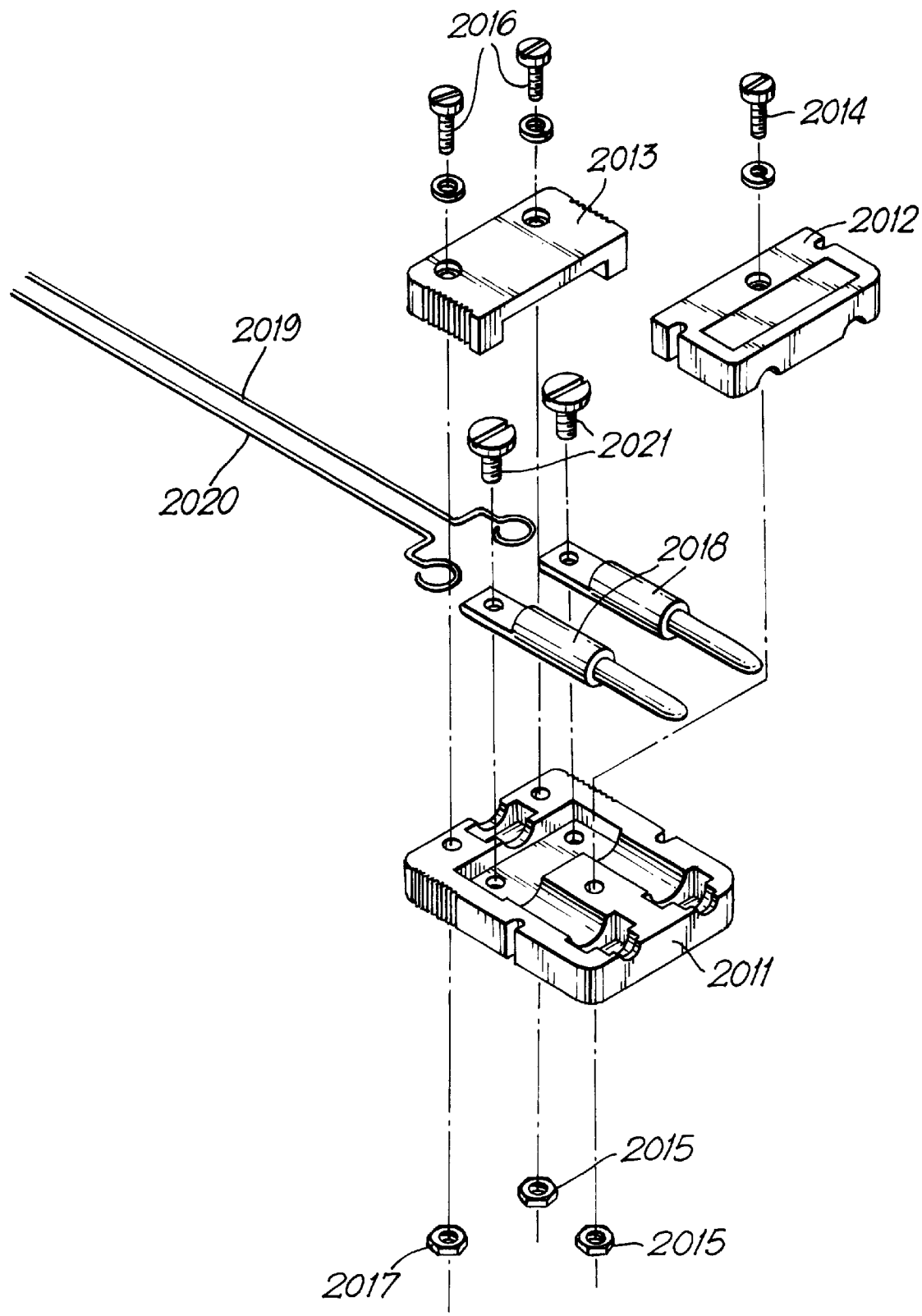
FIG. 27 shows, with the components thereof in separated condition, a second form of two-pin male connector having a body structure of ferrite material.

FIG. 27 shows a connector, for a thermocouple or a pair of wires of dissimilar metals, having a body of ferrite material with a lower part 2011 and upper parts 2012 and 2013, which can be assembled respectively by a bolt 2014 with a nut 2015 and bolts 2016 with nuts 2017. Within the parts 2011 and 2012 there are formed recesses to receive pins 2018 to which respective wires 2019 and 2020 can be secured by screws 2021.

Figure 28:
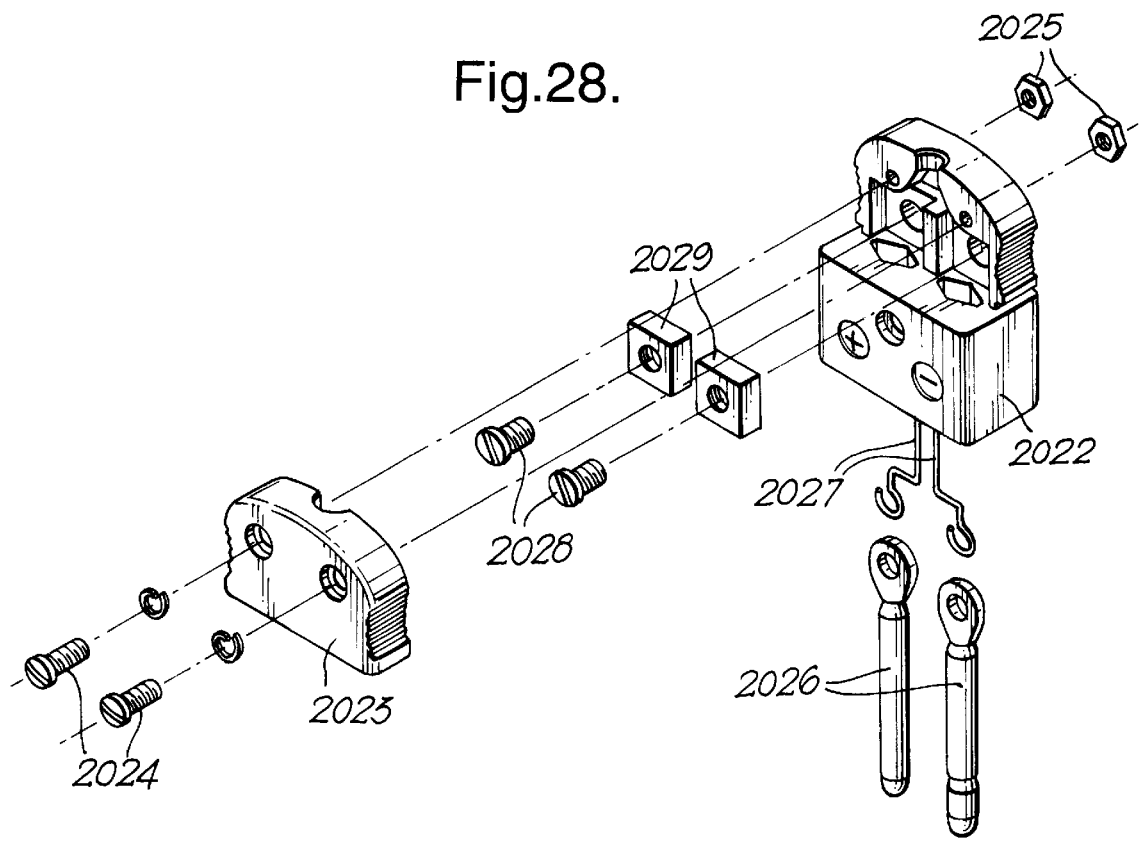
FIG. 28 shows, with the components thereof in separated condition, a third form of two-pin male connector having a body structure of ferrite material.

FIG. 28 shows a connector, for a thermocouple or a pair of wires of dissimilar metals, having a body of ferrite material with a first part 2022 and a second part 2023 which can be assembled by bolts 2024 with nuts 2025. Within the part 2022 there are formed recesses to receive pins 2026 to which wires 2027 can be secured by bolts 2028 and nuts 2029.

Figure 29:
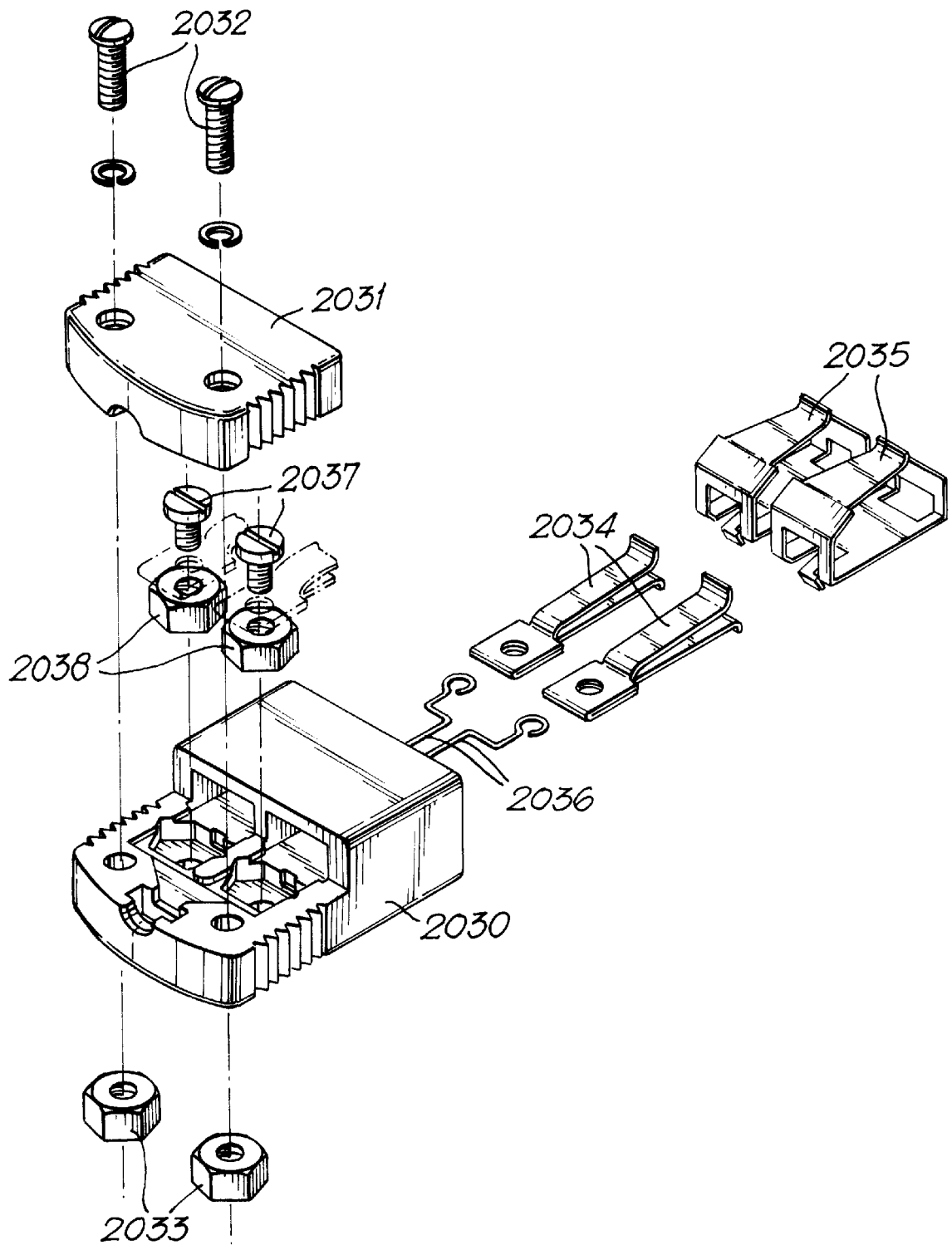
FIG. 29 shows, with the components thereof in separated condition, a first form of two-socket female connector having a body structure of ferrite material.

FIG. 29 shows a connector, for a thermocouple or a pair of wires of dissimilar metals, having a body of ferrite material with a first part 2030 and a second part 2031 which can be assembled by bolts 2032 with nuts 2033. Within the part 2030 there are formed recesses to receive female spring terminals 2034, having respective housings 2035, to which wires 2036 can be secured by bolts 2037 with nuts 2038.

Figure 30:
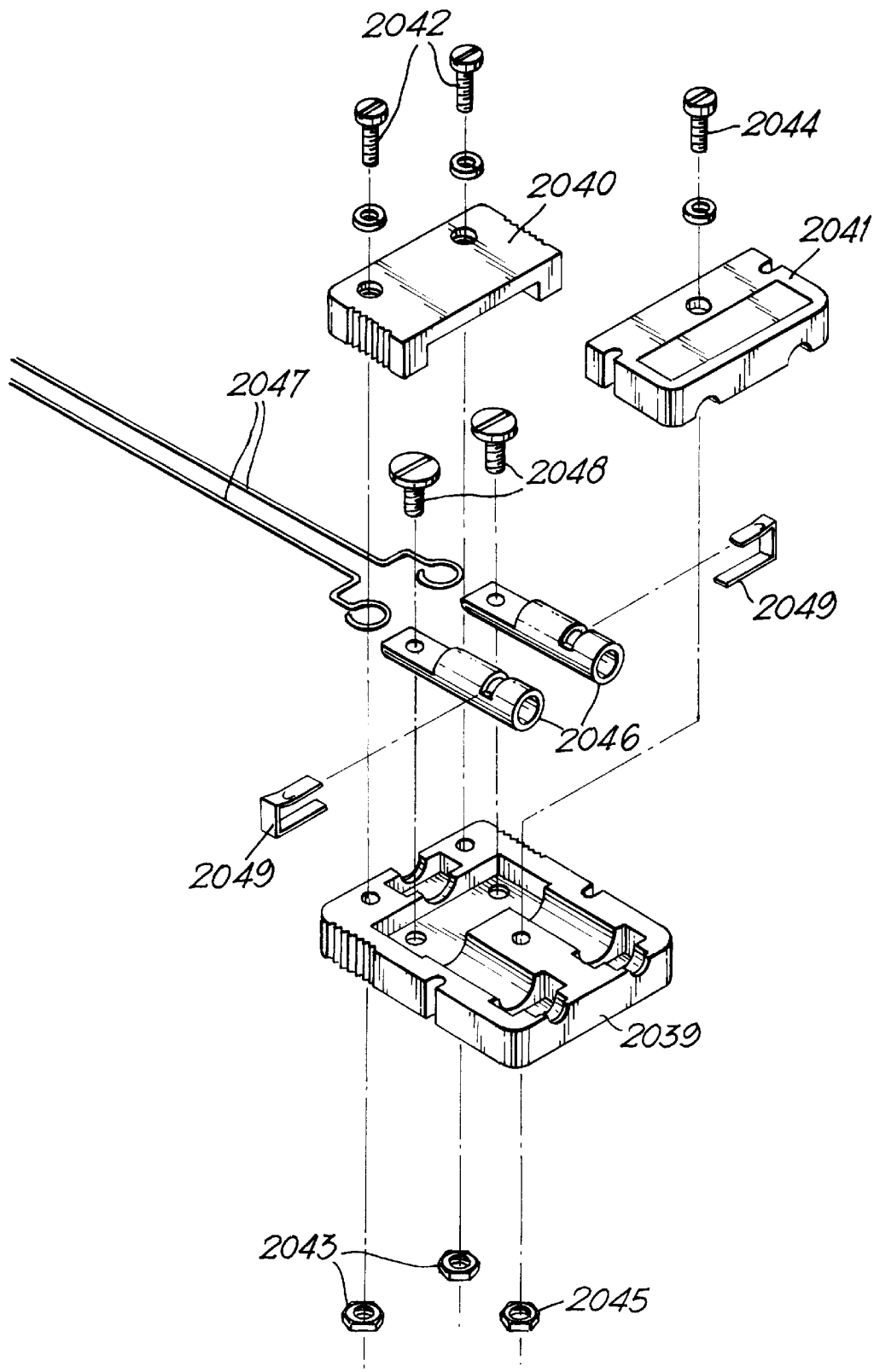
FIG. 30 shows, with the components thereof in separated condition, a second form of two-socket female connector having a body structure of ferrite material.

FIG. 30 shows a connector, for a thermocouple or a pair of wires of dissimilar metals, having a body of ferrite material with a first part 2039, and a second part 2040 and a third part 2041. The part 2040 can be assembled to the part 2039 by bolts 2042 with nuts 2043, and the part 2041 can be assembled to the part 2039 by a bolt 2044 with a nut 2045. Within the parts 2039, 2040 and 2041 there are formed recesses to receive female socket terminals 2046 to which respective wires 2047 can be secured by screws 2048. The terminals 2046 have respective spring clips 2049.

Figure 31:
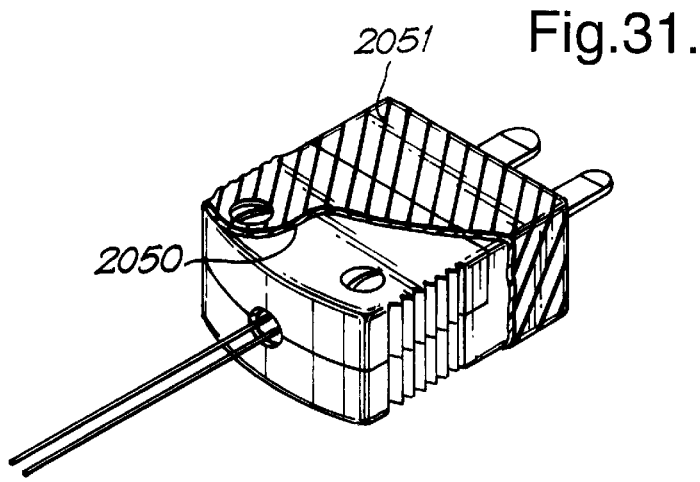
FIG. 31 is a perspective view of the connector of FIG. 26, when fully assembled, and showing an additional coating material having identification marking thereon.

FIG. 31 shows a connector, assembled, of the kind described with reference to FIG. 26, but with the addition of a coating 2050 on the ferrite body of a material of, for example, a plastic, which may serve as a means of protection against shocks and damage, and/or may carry identification markings, such as the strips 2051 shown, or dots, figures or other marking as desired. The coating may, for example, be added by dipping or spraying. Marking may be in color or have raised tactile indicators, bumps or ridges.

Figure 32:
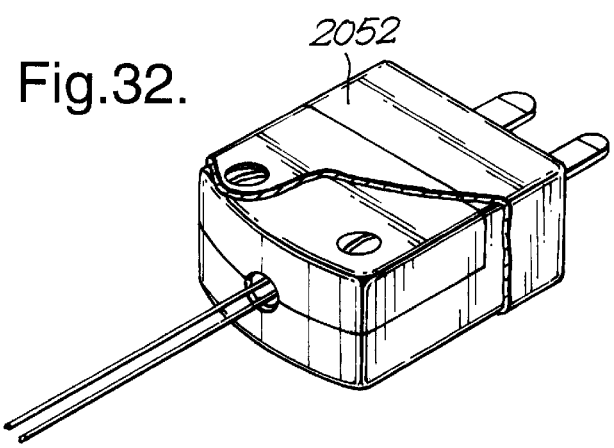
FIG. 32 is a perspective view of a connector, fully assembled, corresponding substantially to that of FIG. 26, and showing an additional protective sheath about the body.

FIG. 32 shows a connector, assembled, of the kind described with reference to FIG. 26, but with the addition about the ferrite body of a sheath 2052 for protection and/or for identification.

Figure 33:
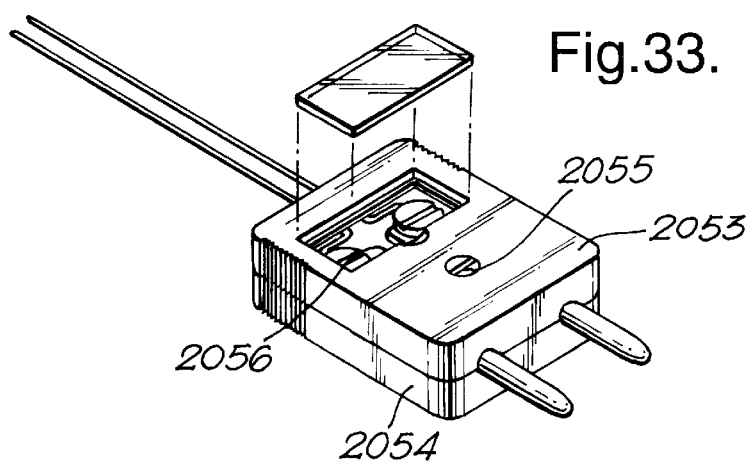
FIG. 33 is a perspective view of a modification of FIG. 27, to show a window for access to the interior of the connector.

FIG. 33 shows a connector, assembled, which is similar to that of FIG. 27, but wherein the two upper body portions 2012–2013 of the ferrite body of FIG. 27 are replaced by a single upper body portion 2053 assembled to a lower body portion 2054 by a single screw 2055. In the body portion 2053 there is formed a window 2056, for access to the interior, which can be left open or can be covered by a cover portion 2057 which may be detachable (as shown) or may be hinged to the body portion 2053.

Figure 34:
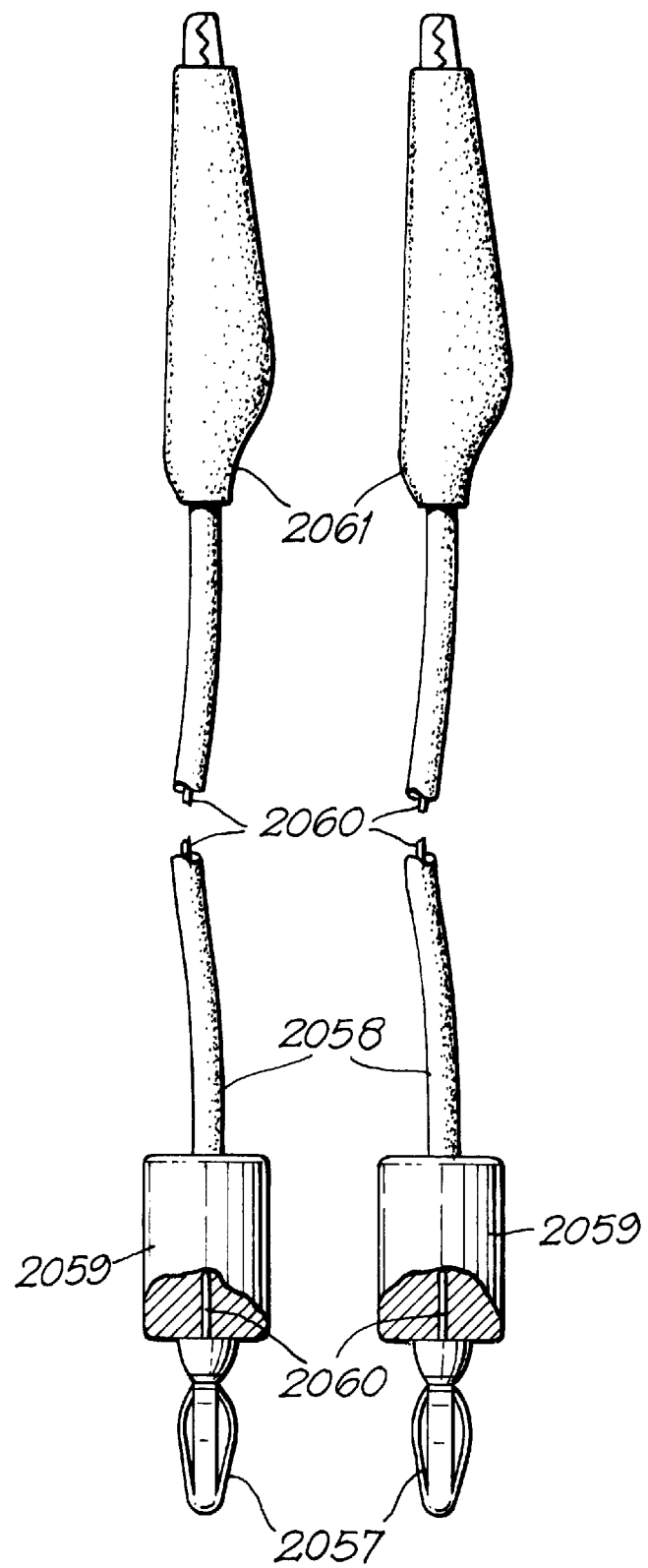
FIG. 34 is an elevation of a pair of identical single-wire leads, e.g. wires of a pair of dissimilar metals, each of which has at one end, adjacent to a banana plug, a sheath in the form of a cylindrical plug body or casing of ferrite material.

FIG. 34 shows an arrangement of "banana" plug single wire lead which may, of course, be used in twin or other multiple sets. On each such lead, a banana plug 2057 has a collar secured to one end of a cylindrical block or housing 2059 of ferrite material through which a single wire 2060 passes though conventional sleeving 2058 to a spring-loaded "crocodile" clip 2061. Such leads may be used conveniently in pairs to accommodate the dissimilar metal wires of a thermocouple pair. Where it is desired to terminate a pair of dissimilar metal wires forming a thermocouple, the two wires 2060 may be bared at the end remote from the banana plug to provide a thermocouple head, with omission of the respective crocodile clips 2061.

It will be apparent to those skilled in the art that there may be provided one, or again three, or a greater number, of male pins, female sockets, connector screws or bolts within the connector bodies of FIGS. 26 to 33, to coact with a similar number of wires. FIGS. 31 to 34 are preferred embodiments, in that they show thermocouples in a ferrite housing.

It will also be apparent to those skilled in the art that caution should be exercised when two physically separated conductors are carrying a balanced signal. Each conductor must receive the same protection from the ferrite, otherwise a common-mode rejection circuit which may be provided in the instrumentation may not be able to compensate for any unbalance.

Figure 35:
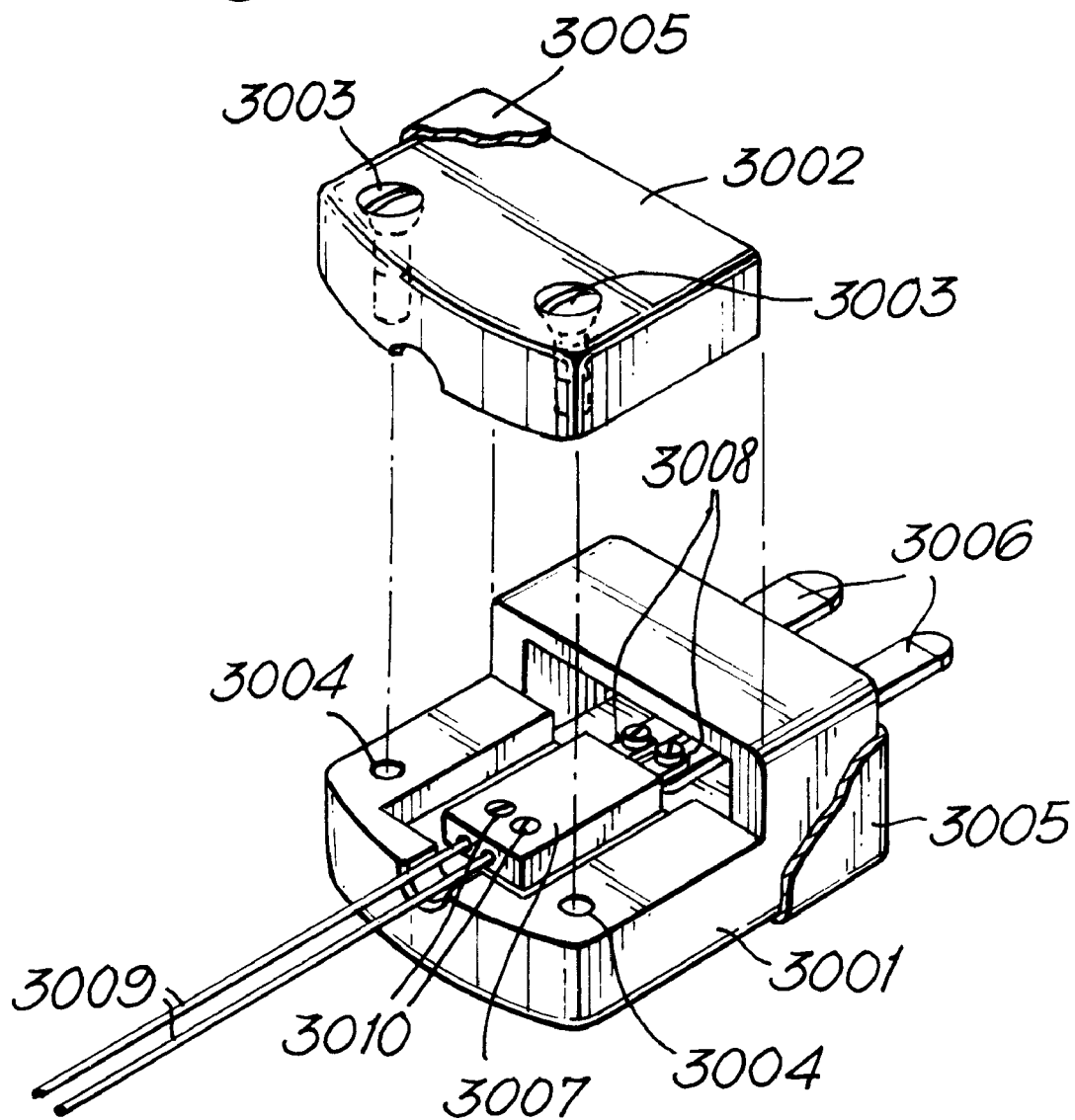
FIG. 35 is a perspective elevation of a further form of connector, for a thermocouple pair, which includes a signal indicating and/or modification means disposed, with its connections, wholly within a ferrite body.

Referring to FIG. 35, there is shown a form of connector which includes additionally a signal indicating and/or modification means. The connector has a main body portion 3001 and a removable cover portion 3002 which can be secured onto the main body portion 3001 in any convenient manner, for example, by screws 3003 engaging into threaded holes 3004. The body 3001–3002 is composed wholly or mainly of ferrite material. Both the main body portion 3001 and the cover portion 3002 may additionally have a coating, or sheath, 3005 which may a decorative or protective against physical shocks, or may give an indication of information concerning the nature of the connector or its contents, or any combination of these three functions. For example, it may be a metal sheath with stripes, dots, embossing, or figures or lettering.

The main body portion 3001 carries two metal tags or pins 3006 for insertion into appropriate receptor sockets of for example an instrument or a panel.

Within the main body portion 3001 there is a recess which houses a signal indicating and/or modification or modulation means 3007 having at one of its ends two metal terminals 3008 which are attached by screws to the inner end of the respective tag or pin 3006. At its other end, the signal indicating and/or modification or modulating means 3007 has openings to receive respective wires 3009 of a pair of wires of dissimilar metals, for example of a thermocouple pair. These wires are securable in the signal indicating and/or modification or modulation means 3007 by respective screws 3010. It will be seen that, when the cover portion is secured in position on the main body portion, the connections between the wires 3009 and the signal modification means 3007, and the connections between the signal indicating and/or modification means 3007 and the tags or pins 3006, are all entirely or substantially entirely contained within, and shielded by, the ferrite material of the connector body.

Whilst the connector has been shown with two tags or pins 3006, and two wires 3009, it will be apparent to those skilled in the connector art that three or more such items may be used in such a connector.

By way of example, the signal indicating and/or modification or modulation or filtering or amplifying means 3007 may be a filter, a printed circuit, an etched circuit, a microchip, or means such as a light for indicating variation of, or passage of, an electric current, or any combination of these functions. Clearly, it would be possible to have two or more of the means 3007 arranged and connected in series within the connector, and different such means 3007 may be applied for each or some of a plurality of wires such as 3009.

The means 3007 may be a signal booster for a cable such as an undersea cable.

Where the means 3007 serves to give a visual indication of modification of or existance of a signal, there may be provided a small window area, not shown, in the body portion 3001, or in the cover portion 3002. Such connector means may have its means 3007 arranged to be actuated at a threshold current, and they may be disposed advantageously in a cluster or array with same or different thresholds.

To obtain the greatest possible useful effect from the presence of the ferrite material, it is advantageous if the mating surfaces of any portions of the ferrite body shall be as free as possible from projections or cavities therein which might prejudice the acting of the ferrite body electrically as a single whole, e.g. it is preferred to make such mating surfaces with a mirror-finish.

The ferrite body portions or the shell housings of the connectors may advantageously be made by machining or by molding e.g. in a similar manner to the conventional molding of ceramic bodies. It will be apparent to those skilled in the electrical connector art that male plugs, female sockets, connector tabs, and wires, may all be incorporated directly into a molded body at the time of molding of the body, thereby to eliminate the need for separable portions of the ferrite body, for assembly screws or bolts, and for screws or bolts for connection of the wires.

For connectors and other components which are to be used at high temperatures, ferrite powder may be mixed with ceramic prior to shaping, forming etc.

Figure 36:
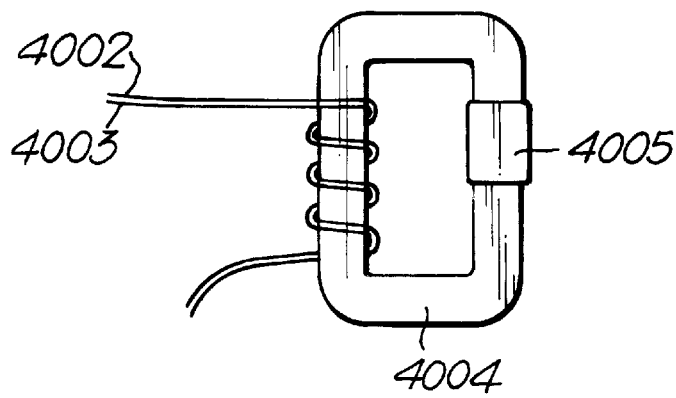
FIG. 36 is an elevation of a component utilising a ferrite core for the protection of a telephone line.

Referring to FIG. 36 there is shown an elevation of a protective device for a telephone line, e.g. a line entering a building. The telephone line 4001 has a pair of conductors 4002, 4003 which run parallel and are 600-ohm balanced. The conductor 4001 is wound for several turns about one arm of a rectangular core 4004 of ferrite material. The opposed arm of the core 4004 carries a shorted turn 4005 of good conductor which will absorb any surges occurring.

Figure 37:
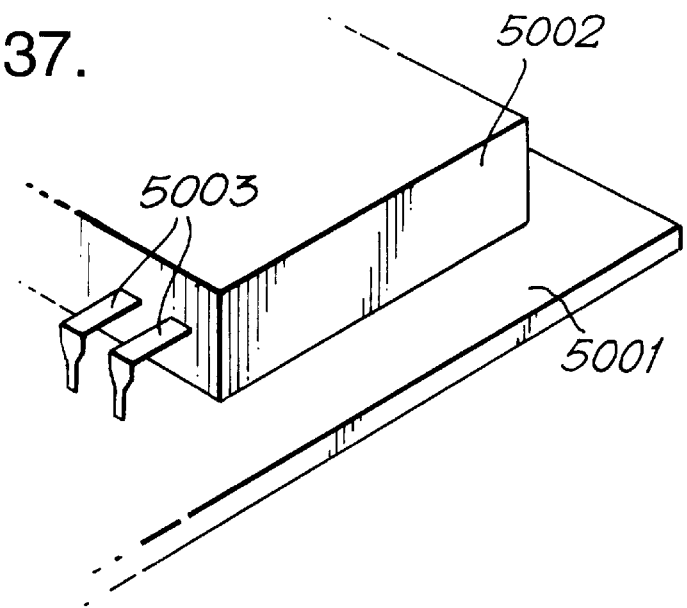
FIG. 37 is a perspective elevation of part of a printed circuit board which incorporates a ferrite protected connector.

Referring to FIG. 37 there is shown a perspective elevation of part of a printed circuit board. The board 5001 has mounted on it, or secured to it, a connector 5002 with terminals 5003. The connector 5002 is made with a body of ferrite material.

Figure 38:
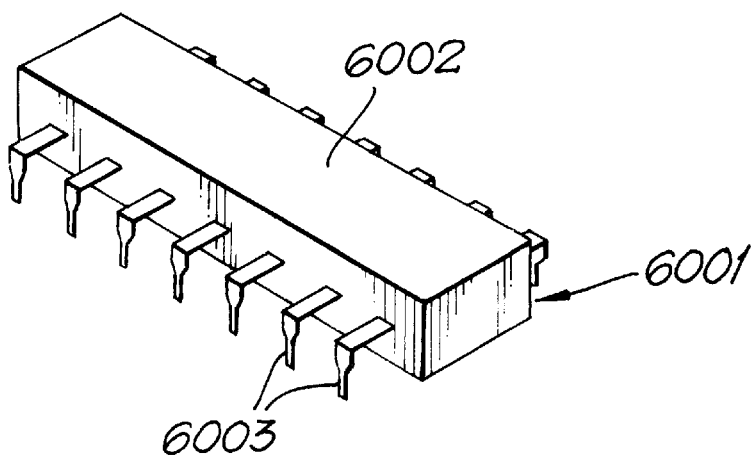
FIG. 38 is a perspective elevation of an electronic component, incorporating solid state circuitry, wherein a case for the component is made of ferrite material.

Referring to FIG. 38 there is shown a perspective elevation of an electronic component incorporating solid state circuitry. The component 6001 has its DIP case 6002 made of ferrite material from which project connectors 6003. The solid state circuitry inside the case 6002 is protected by the ferrite material against interference from external electromagnetic or electrostatic interference, and likewise any electromagnetic or electrostatic disturbances which may originate from the circuitry will be prevented from reaching adjacent components.

A list (not exhaustive) of suitable examples of pairs of metals for use in thermocouples is:

| | |
|---|---|
| Copper-constantan | Chromel-Alumel |
| | Iron-constantan |
| Chromel-constantan | Tungsten-Rhenium |
| Platinum-Platinum/Rhodium | Platinum/Rhodium-Platinum/Rhodium |
| Tungsten-Tungsten/Rhenium | Tungsten/Rhenium-Tungsten/Rhenium |

It will be seen that, in all of the constructions described and/or shown, the connection between the wires (of dissimilar metals) and the connector conductors are fully shielded within the ferrite body.

In connection with the art of printed circuit boards, it is further proposed that such a board may itself be formed of ferrite material with conductive, e.g. copper, circuitry bonded to the ferrite, or again a sheet of ferrite may be bonded, e.g. cemented, to a printed circuit board after soldering of the board has been completed.

Although various specific embodiments of this invention have been described and illustrated herein, it will be obvious to those having skill in this art that various other fully equivalent embodiments consistent with the invention are possible and evident within the scope of this disclosure.

We claim:

1. An electrical device for establishing a separable electrical connection with at least two external conductors of dissimilar metals, said device comprising:

a housing formed of electrically insulating material including a conductor guide groove;

an electrical contact element supported by said housing, said contact element having first means thereon capable of separately engaging at least a first external electrical conductor to define a portion of an electrical path of finite length extending through and away from said device, said housing being totally transversely separable across a parting plane to form two housing halves, a ferrite element divided into components which nest in each of said housing halves and having a conductor passage extending therethrough, said ferrite element being positioned relative to said housing so that said conductor passage surrounds at least an axial portion of said electrical path extending through and away from said electrical device along said guide groove beyond said ferrite.

2. An electrical device in accordance with claim 1, wherein said electrical contact element further includes second means for separately engaging a second external conductor.

3. An electrical device in accordance with claim 1 wherein said housing is formed of a first separable housing portion and a second separable housing portion, said housing portions being separable about a common separation plane and said ferrite element is formed of a first separable element portion and a second separable element portion, said separable portions being separable about a plane extending through said conductor opening, said first separable portion being mounted to said first separable housing portion and said second separable portion being mounted to said second separable housing portion, such that upon separation of said first and second separable housing portions said first and second separable element portions will separate also so that a conductor may be moved laterally into and out of said conductor passage in said ferrite element, and upon engagement of said first separable housing portion with said second separable housing portion said first and second separable element portions are engaged in a mating relationship.

4. An electrical device in accordance with claim 1 wherein said electrical contact element is a female contact element having a given axial length, that is capable of telescopically engaging said first external conductor and said ferrite element is positioned to surround at least a portion of the axial length of said female contact element.

5. An electrical device in accordance with claim 1 wherein said housing member is configured for mounting said connector to a panel.

6. An electrical device in accordance with claim 1, further comprising a second external electrical conductor that is electrically and mechanically coupled to said electrical contact element.

7. An electrical device in accordance with claim 6 wherein said ferrite element is detachably mounted to said housing externally thereof so as to surround an axial portion of the length of said second external conductor.

8. An electrical device in accordance with claim 1, wherein said connector is a terminal strip connector; said housing has a contact support face thereon; said contact element is a conductive strip mounted in substantially parallel, abutting relationship with said contact support face of said housing, having a first screw terminal threadedly engaged to said strip proximate one end thereof for separably engaging a second external conductor, and said means on said contact element for separably engaging said first external conductor is a second screw terminal threadedly engaged to said conductive strip at the end thereof remote from said first screw terminal; and said ferrite element is positioned on said housing so that said conductive strip extends along said conductive passage with said first and second screw terminals being positioned on opposite sides of said ferrite element.

9. An electrical device in accordance with claim 8 wherein, said housing has a pair of substantially parallel, spaced apart barrier walls positioned on opposite sides of said contact element and extending outwardly in a substantially normal direction to said contact support face of said housing, said connector further comprises a separable block of insulating material insertable in substantially force-fitting removable relationship between said barrier walls, said separable block having a contact-opposing face portion thereon that is positioned in opposing relationship with said contact element when said separable block of insulating material is engaged between said barrier walls, said ferrite element is formed of a first separable portion and a second separable portion, said separable element portions being separable about a parting plane extending through said conductor opening, said first separable element portion being mounted to said housing and said second separable element portion being mounted to said contact-supporting face of said housing when said block of insulating material is fully inserted between said barrier walls so as to bring said first and second separable element portions into mating relationship.

* * * * *